United States Patent
Sakai

(10) Patent No.: US 10,523,371 B2
(45) Date of Patent: Dec. 31, 2019

(54) WIRELESS COMMUNICATION DEVICE, WIRELESS COMMUNICATION METHOD, AND WIRELESS COMMUNICATION SYSTEM

(71) Applicant: SONY CORPORATION, Tokyo (JP)

(72) Inventor: Eisuke Sakai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/747,293

(22) PCT Filed: Jul. 22, 2016

(86) PCT No.: PCT/JP2016/071555
§ 371 (c)(1),
(2) Date: Jan. 24, 2018

(87) PCT Pub. No.: WO2017/043195
PCT Pub. Date: Mar. 16, 2017

(65) Prior Publication Data
US 2019/0007172 A1    Jan. 3, 2019

(30) Foreign Application Priority Data
Sep. 11, 2015  (JP) ................................ 2015-179775

(51) Int. Cl.
*H04L 1/16*    (2006.01)
*H04L 5/00*    (2006.01)
(Continued)

(52) U.S. Cl.
CPC .......... *H04L 1/1621* (2013.01); *H04L 1/0026* (2013.01); *H04L 1/0027* (2013.01);
(Continued)

(58) Field of Classification Search
CPC combination set(s) only.
See application file for complete search history.

(56) References Cited

U.S. PATENT DOCUMENTS 6,557,135 B1    4/2003  Balachandran et al.
2006/0034174 A1*  2/2006  Nishibayashi ........ H04L 1/1614
                                                 370/235
(Continued)

FOREIGN PATENT DOCUMENTS

EP    2 760 171 A2    7/2014
JP    2003-23428 A    1/2003
(Continued)

OTHER PUBLICATIONS

Wu, Tianyu, et al., "Comment Resolution on CID 3739,3743", IEEE 802.11-11/1528r0, Nov. 2011, Total 3 pages.
(Continued)

*Primary Examiner* — Yee F Lam
(74) *Attorney, Agent, or Firm* — Xsensus, LLP

(57) ABSTRACT

[Object] To provide a mechanism which can improve communication efficiency while maintaining reliability in communication.
[Solution] A wireless communication device including: a communication unit configured to receive a first frame including reception information in which whether a frame has been received is specified, the first frame being transmitted on a basis of measurement information regarding reception of a frame; and a control unit configured to perform frame retransmission control on a basis of the reception information. A wireless communication device including: a communication unit configured to transmit a first frame including reception information in which whether a frame has been received is specified on a basis of measurement information regarding reception of a frame.

14 Claims, 20 Drawing Sheets

(51) Int. Cl.

| | |
|---|---|
| *H04L 12/26* | (2006.01) |
| *H04L 1/00* | (2006.01) |
| *H04W 28/04* | (2009.01) |
| *H04W 84/12* | (2009.01) |
| *H04W 24/10* | (2009.01) |
| *H04W 72/04* | (2009.01) |
| *H04B 17/336* | (2015.01) |

(52) U.S. Cl.
CPC .......... *H04L 1/1657* (2013.01); *H04L 1/1685* (2013.01); *H04L 5/0055* (2013.01); *H04L 43/0829* (2013.01); *H04W 24/10* (2013.01); *H04W 28/04* (2013.01); *H04W 72/0446* (2013.01); *H04W 84/12* (2013.01)

(56) References Cited

U.S. PATENT DOCUMENTS

| | | | |
|---|---|---|---|
| 2007/0223620 A1 | 9/2007 | Kalhan et al. | |
| 2009/0147734 A1 | 6/2009 | Naka et al. | |
| 2010/0278060 A1* | 11/2010 | Lee | H04W 64/00 370/252 |
| 2013/0028243 A1 | 1/2013 | Wentink et al. | |
| 2015/0092652 A1* | 4/2015 | Ramamurthy | H04W 72/005 370/312 |
| 2017/0171888 A1* | 6/2017 | Itagaki | H04W 74/08 |
| 2017/0187848 A1* | 6/2017 | Itagaki | H04L 1/0079 |
| 2017/0280415 A1* | 9/2017 | Kim | G01S 5/02 |
| 2018/0206139 A1* | 7/2018 | Wang | H04B 7/15507 |
| 2018/0227973 A1* | 8/2018 | Tsuboi | H04W 76/14 |
| 2018/0343096 A1* | 11/2018 | Kim | H04W 52/243 |

FOREIGN PATENT DOCUMENTS

| | | |
|---|---|---|
| JP | 2006-148360 A | 6/2006 |
| JP | 2009-49704 A | 3/2009 |
| JP | 2009-530980 A | 8/2009 |

OTHER PUBLICATIONS

International Search Report dated Sep. 27, 2016 in PCT/JP2016/071555 filed Jul. 22, 2016.

Extended Search Report issued in European Application 16844059.2-1219 dated Feb. 26, 2019.

* cited by examiner

FIG. 5

| MEASUREMENT START TIME | MEASUREMENT TIME LENGTH | INTERVAL TO MEASUREMENT RESUMPTION | NUMBER OF MEASUREMENT OPERATIONS |
|---|---|---|---|
| 8 | 2 | 2 | 2 |

Octet(s)

FIG. 6

| TRANSMISSION PERMISSION START TIME | TRANSMISSION PERMISSION TIME LENGTH |
|---|---|

Octet(s)　　　8　　　　　　　　　　2

FIG. 7

| IDENTIFIER OF RECEPTION CHARACTERISTIC INDEX | THRESHOLD VALUE OF RECEPTION CHARACTERISTIC INDEX | EXTRA INFORMATION USED IN CALCULATION OF RECEPTION CHARACTERISTIC |
|---|---|---|

Octet(s)　　　1　　　　　　　　2　　　　　　　　2

FIG. 10

| IDENTIFIER OF RECEPTION CHARACTERISTIC INDEX | STATISTICAL VALUE OF RECEPTION CHARACTERISTIC INDEX | START SEQUENCE NUMBER RELATED TO BITMAPPED RECEPTION INFORMATION | BITMAPPED RECEPTION INFORMATION | NUMBER OF FRAMES RECEIVED ONLY IN RETRANSMISSION | NUMBER OF FRAMES RECEIVED IN BOTH FIRST TRANSMISSION AND RETRANSMISSION | TERMINAL STATE INFORMATION |
|---|---|---|---|---|---|---|
| 1 | 2 | 2 | 16 | 2 | 2 | 2 |

Octet(s)

WIRELESS COMMUNICATION DEVICE, WIRELESS COMMUNICATION METHOD, AND WIRELESS COMMUNICATION SYSTEM

TECHNICAL FIELD

The present disclosure relates to a wireless communication device, a wireless communication method, and a wireless communication system.

BACKGROUND ART

In recent years, wireless local area networks (LAN) represented by Institute of Electrical and Electronics Engineers (IEEE) 802.11 have become widespread. In wireless LANs, however, phenomena which interrupt communication may occur. The phenomena include, for example, propagation loss, shadowing, fading or collision of frames (packets) being transmitted, and the like. Due to the phenomena, assured reliability in communication on wireless LANs is desired for the purpose of wider distribution of wireless LANs.

Thus, standards of wireless LANs provide mechanisms for conveying successful reception of a frame to a transmission source of the frame. Specifically, a wireless communication device which has received a frame destined for the device transmits an acknowledgement (which will also be referred to as ACK below) frame. In a case in which the ACK frame is successfully received, a wireless communication device serving as a transmission source ends the transmission process of the frame, assuming that the transmission is completed. Conversely, in a case in which the ACK frame is not successfully received, the wireless communication device performs a re-transmission process of the frame, assuming that the transmission has failed.

Meanwhile, the number of wireless communication devices is increasing as well in accordance with the distribution of wireless LANs. If the number of wireless communication devices increases, there is a high possibility of communication efficiency deteriorating, and thus improvement of communication efficiency is desired.

With regard to the above-mentioned problem, technologies for performing efficient communication with a plurality of wireless communication devices have developed. As such a technology, for example, there is a multicast scheme in which a frame is transmitted to one or a plurality of wireless communication devices at a time. Note that a system in which a frame is transmitted to a single wireless communication device is called a unicast scheme.

Here, there are cases in which it is desired to apply the acknowledgement mechanism also to multicast frames in view of improvement of reliability in communication. Thus, the acknowledgement mechanism for multicast communication is provided in the standards of wireless LANs. Specifically, a wireless communication device that has transmitted a multicast frame transmits a block ACK request (which will also be referred to as block ACK request (BAR) below) frame to each of wireless communication devices serving as destinations of the multicast frame individually and receives a block ACK (which will also be referred to as block ACK (BA) below) frame as a response to the BAR frame. In addition, the wireless communication devices that have received the multicast frame destined for the devices transmit BA frames upon receiving the BAR frame in the unicast scheme.

For example, Patent Literature 1 discloses an invention related to a wireless communication device which exchanges a BAR frame and a BA frame with each of a plurality of terminals serving as destinations of multicast frames after the multicast frames destined for the plurality of terminals are transmitted.

CITATION LIST

Patent Literature

Patent Literature 1: JP 2009-049704A

DISCLOSURE OF INVENTION

Technical Problem

In the invention disclosed in Patent Literature 1, however, there is a possibility of communication efficiency deteriorating when the number of terminals serving as transmission destinations of multicast frames increases. In the invention disclosed in Patent Literature 1, for example, BAR frames and BA frames are exchanged between respective terminals serving as transmission destinations of the multicast frames, and thus when the number of terminals increases, communication overhead taken for an acknowledgement increases as well. Thus, communication throughput also deteriorates.

In addition, the above-described issues are not limited to multicast communication, and can similarly appear in other types of communication in which frames are transmitted to a plurality of destinations at a time such as frame multiplexing communication.

Therefore, the present disclosure proposes a mechanism which can improve communication efficiency while maintaining reliability in communication.

Solution to Problem

According to the present disclosure, there is provided a wireless communication device including: a communication unit configured to receive a first frame including reception information in which whether a frame has been received is specified, the first frame being transmitted on a basis of measurement information regarding reception of a frame; and a control unit configured to perform frame retransmission control on a basis of the reception information.

Further, according to the present disclosure, there is provided a wireless communication device including: a communication unit configured to transmit a first frame including reception information in which whether a frame has been received is specified on a basis of measurement information regarding reception of a frame.

Further, according to the present disclosure, there is provided a wireless communication method including: receiving, by a communication unit, a first frame including reception information in which whether a frame has been received is specified, the first frame being transmitted on a basis of measurement information regarding reception of a frame; and performing, by a control unit, frame retransmission control on a basis of the reception information.

Further, according to the present disclosure, there is provided a wireless communication method including: transmitting, by a communication unit, a first frame including reception information in which whether a frame has been received is specified on a basis of measurement information regarding reception of a frame.

Further, according to the present disclosure, there is provided a wireless communication system including: a wireless communication device configured to transmit a first frame including reception information in which whether a frame has been received is specified on a basis of measurement information regarding reception of a frame; and a wireless communication device configured to receive the first frame and perform frame retransmission control on a basis of the reception information.

Advantageous Effects of Invention

According to the present disclosure described above, a mechanism which can improve communication efficiency while maintaining reliability in communication is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating an example of a configuration of measurement time information according to the present embodiment.

FIG. 6 is a diagram illustrating an example of a configuration of transmission time information of an alert frame according to the present embodiment.

FIG. 7 is a diagram illustrating an example of a configuration of measurement content information according to the present embodiment.

FIG. 10 is a diagram illustrating an example of a configuration of measurement information according to the present embodiment.

MODE(S) FOR CARRYING OUT THE INVENTION

Figure 1:
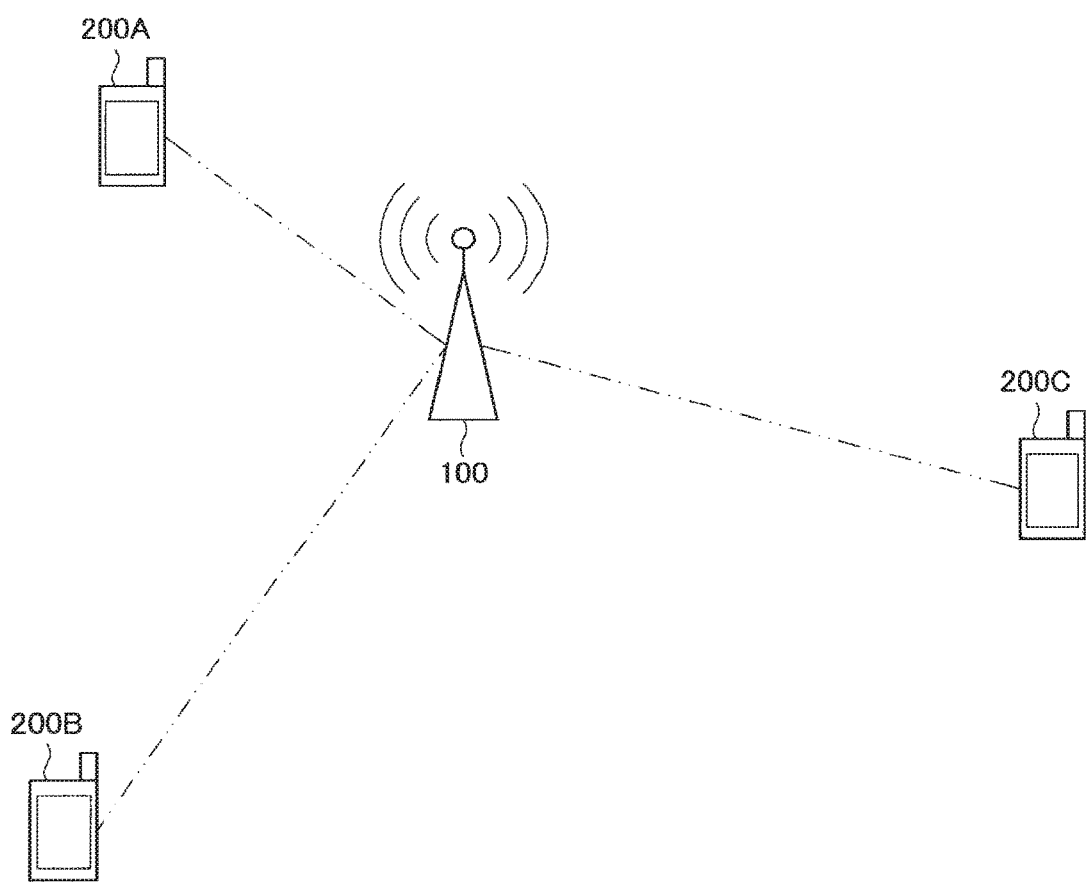
FIG. 1 is a diagram illustrating an example of a configuration of a wireless communication system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the present specification and the drawings, different numbers are attached to the end of the same reference number to distinguish a plurality of components having substantially the same functional configuration from each other in some cases. For example, a plurality of components having substantially the same function are distinguished, such as a STA 200A and a STA 200B, as necessary. However, in a case in which it is unnecessary to distinguish substantially the same functional configurations, only the same reference number is given thereto. For example, in a case in which it is not particularly necessary to distinguish the STA 200A and the STA 200B from each other, they are simply referred to as STA 200.

Note that description will be provided in the following order.

1. Overview of wireless communication system according to one embodiment of present disclosure
2. First embodiment of present disclosure (example in which only measurement end frame is used)
2-1. Basic functional configuration of device
2-2. Details of functions of device
2-3. Processes of devices
2-4. Summary of first embodiment
3. Second embodiment of present disclosure (example in which measurement start and measurement end frames are used)
3-1. Details of functions of device
3-2. Process of device
3-3. Summary of second embodiment
4. Third embodiment of present disclosure (example in which only measurement start frame is used)
4-1. Details of functions of device
4-2. Process of device
4-3. Summary of third embodiment
5. Application examples
6. Conclusion 1. OVERVIEW OF WIRELESS COMMUNICATION SYSTEM ACCORDING TO ONE EMBODIMENT OF PRESENT DISCLOSURE First, an overview of a wireless communication system according to an embodiment of the present disclosure will be described with reference to FIG. 1. FIG. 1 is a diagram illustrating an example of a configuration of a wireless communication system according to an embodiment of the present disclosure.

The wireless communication system includes a wireless communication device 100 and wireless communication devices 200. The wireless communication device 100 and the wireless communication devices 200 each have a wireless communication function of communicating frames (packets). In particular, the wireless communication device 100 has a multicast communication function of transmitting a frame to one or a plurality of wireless communication devices. In addition, the wireless communication device 100 operates as an access point (which will also be referred to as access point (AP) below), and the wireless communication devices 200 operate as stations (each of which will also be referred to as station (STA) below). Hereinbelow, the wireless communication device 100 will also be referred to as AP 100 and the wireless communication devices 200 will also be referred to as STAs 200. Thus, in the wireless communication system, multicast communication is possible from the AP 100 to the plurality of STAs 200. Note that communication from the AP 100 to the STAs 200 will also be referred to as downlink (DL) and communication from the STAs 200 to the AP 100 will also be referred to as uplink (UL).

The wireless communication system includes, for example, the AP 100 and a plurality of STAs 200A to 200C as illustrated in FIG. 1. The AP 100 and the STAs 200A to 200C are connected to each other via wireless communication and transmit and receive frames directly to and from each other. The AP 100 is, for example, a wireless communication device complying with the IEEE 802.11 standard and transmits a multicast frame destined for the STAs 200A to 200C.

Figure 2:
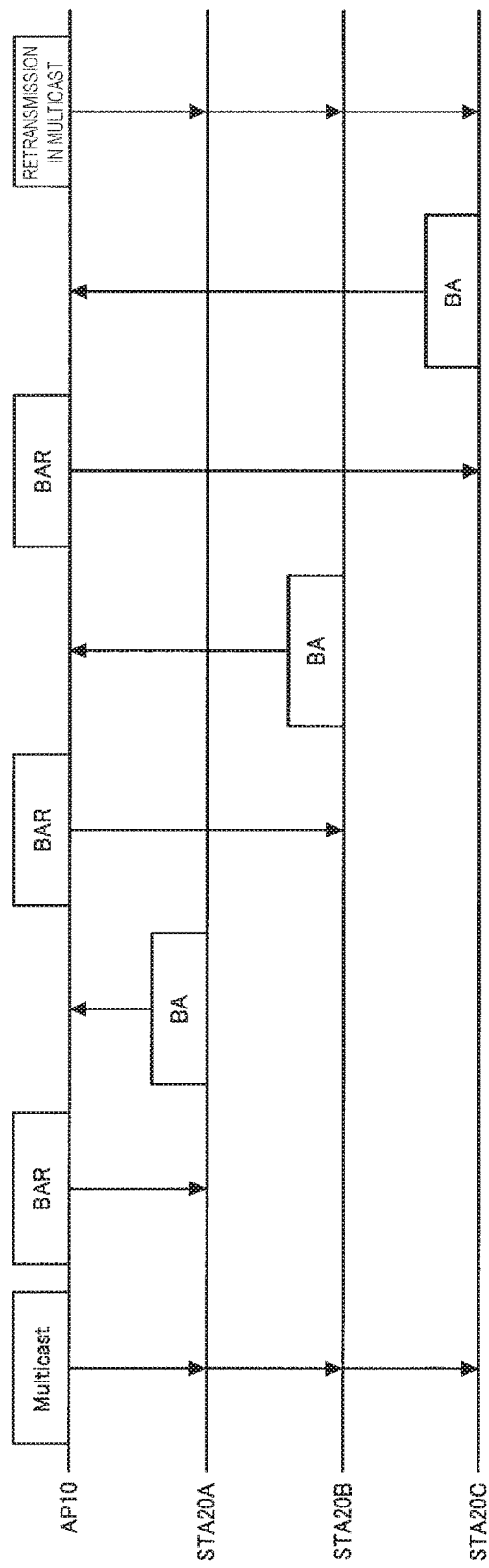
FIG. 2 is a diagram for describing an acknowledgement in multicast communication of the past.

Here, performing an acknowledgement with respect to a multicast frame is considered in order to improve reliability in multicast communication. Specifically, as a mechanism for an acknowledgement of multicast frames, there is an exchange of an acknowledgement request frame and an acknowledgement response frame (which will also be referred to simply as acknowledgement frames without distinction). An acknowledgement request frame and an acknowledgement response frame are, for example, a BAR frame and a BA frame. Furthermore, an acknowledgement in multicast communication of the past will be described with reference to FIG. 2. FIG. 2 is a diagram for describing an acknowledgement in multicast communication of the past. Note that an AP of the past will be referred to as AP 10 and STAs of the past will be referred to as STAs 20.

After multicast frames are transmitted to each of the STAs, acknowledgement frames are exchanged individually by each of the STAs 20 serving as destinations of the multicast frames. For example, the AP 10 first transmits a BAR frame to the STA 20A after the transmission of the multicast frames (in multicast) as illustrated in FIG. 2. The STA 20A that has received the BAR frame transmits a BA frame to the AP 10 as a response to the BAR frame. Successively, BAR frames and BA frames with respect to the multicast frames are exchanged with the respective remaining STAs 20B and 20C.

As described above, with regard to an acknowledgement in the multicast communication of the past, BAR frames and BA frames are exchanged individually with the STAs 20 serving as destinations of multicast frames. Thus, in a case in which the number of STAs 20 increases, communication overhead taken to perform an acknowledgement with regard to the multicast frames increases. Thus, communication throughput deteriorates.

Figure 3:
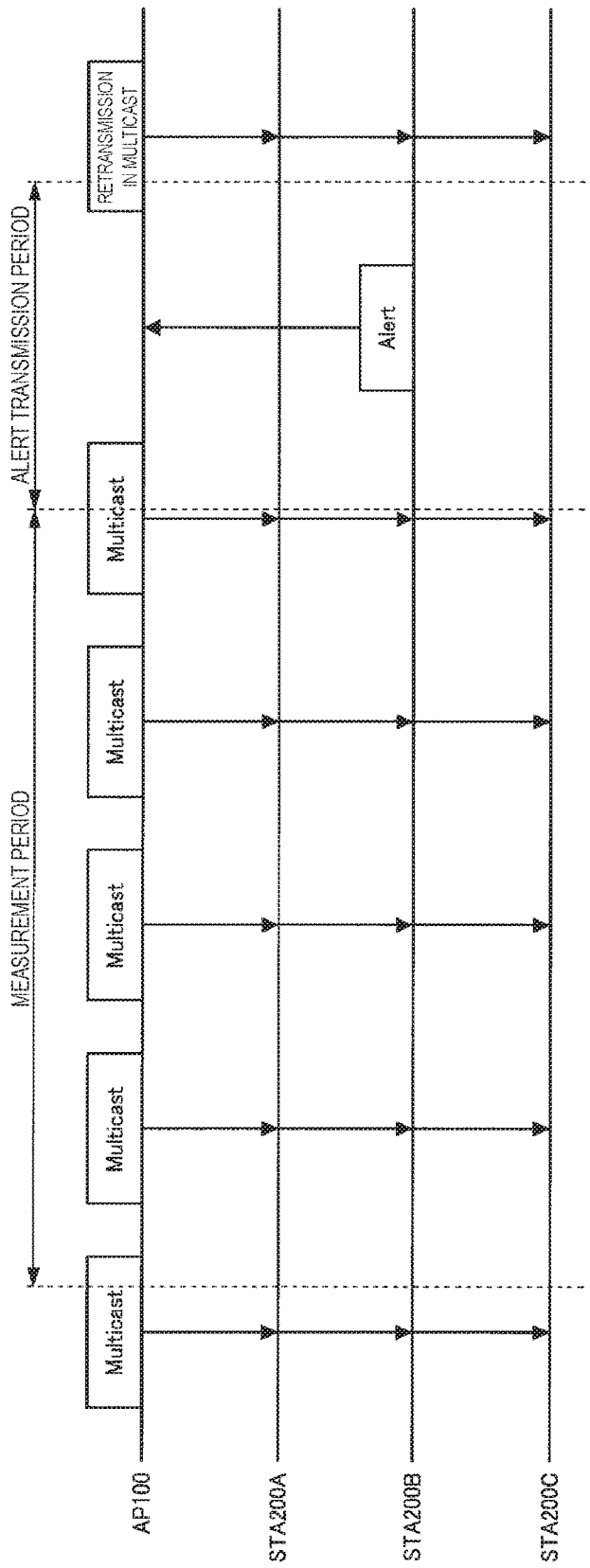
FIG. 3 is a diagram for describing an overview of frame retransmission control according to an embodiment of the present disclosure.

Therefore, the present disclosure proposes a wireless communication system which performs frame retransmission control using a frame including measurement information regarding reception of a frame and reception information in which whether a frame has been received is specified without exchanging an acknowledgement frame. Furthermore, an overview of frame retransmission control according to an embodiment of the present disclosure will be described with reference to FIG. 3. FIG. 3 is a diagram for describing an overview of frame retransmission control according to an embodiment of the present disclosure.

First, an AP 100 transmits multicast frames to a plurality of STAs 200. For example, the AP 100 transmits multicast frames to the STAs 200A to 200C multiple times.

Meanwhile, when a measurement period for reception of frames starts, the STAs 200 perform measurement on the basis of reception of the frames within the measurement period. For example, the STAs 200 perform measurement of reception of a plurality of multi_cast frames transmitted from the AP 100 within the measurement period. As an example, the STAs 200 measure index values of reception characteristics of the multicast frames.

In addition, the STAs 200 determine whether the frames have been received within the measurement period. For example, the STAs 200 record the frames received within the measurement period as reception information.

Then, the STAs 200 notify the AP 100 of measurement results and reception results. For example, the STA 200B transmits an alert (Alert) frame including information indicating the measurement result and reception information to the AP 100. As an example, only an STA 200 whose measurement result satisfies a predetermined condition transmits a corresponding alert frame.

The AP 100 that has received the measurement results and reception results performs retransmission control of multicast frames on the basis of the measurement results and reception results. For example, the AP 100 retransmits the multicast frames on the basis of the measurement results and reception information included in the received alert frame, for example, as illustrated in FIG. 3.

As described above, the wireless communication system according to an embodiment of the present disclosure performs frame retransmission control using a frame including measurement information regarding reception of a frame and reception information in which whether the frame has been received can be specified. Thus, retransmission control can be performed without exchange of an acknowledgement frame performed individually by the STAs 200. Thus, communication efficiency can be improved while reliability in communication is maintained due to frame retransmission. Details thereof will be described below.

Note that, for the sake of convenience in description, devices including the AP 100 and the like of the first to third embodiments will be distinguished from each other by attaching the numbers corresponding to the embodiments to the ends thereof, like an AP 100-1 to an AP 100-3. In addition, although the example in which the wireless communication system includes the AP 100 and the STAs 200 has been described as an example of a wireless communication system in FIG. 1, one of the STAs 200, instead of the AP 100, can be a wireless communication device having a plurality of direct links to the other STAs 200. In this case, the above-described DL can be read as "simultaneous transmission from one STA 200 to a plurality of STAs 200" and the above-described UL can be read as "simultaneous transmission from a plurality of STAs 200 to one STA 200."

2. FIRST EMBODIMENT OF PRESENT DISCLOSURE (EXAMPLE IN WHICH ONLY MEASUREMENT END FRAME IS USED)

The overview of the wireless communication system according to the embodiment of the present disclosure has been described above. Next, an AP 100-1 and an STA 200-1 (which will also be referred to as wireless communication device 100-1 (200-1)) according to a first embodiment of the present disclosure will be described.

2-1. Basic Functional Configuration of Device

Figure 4:
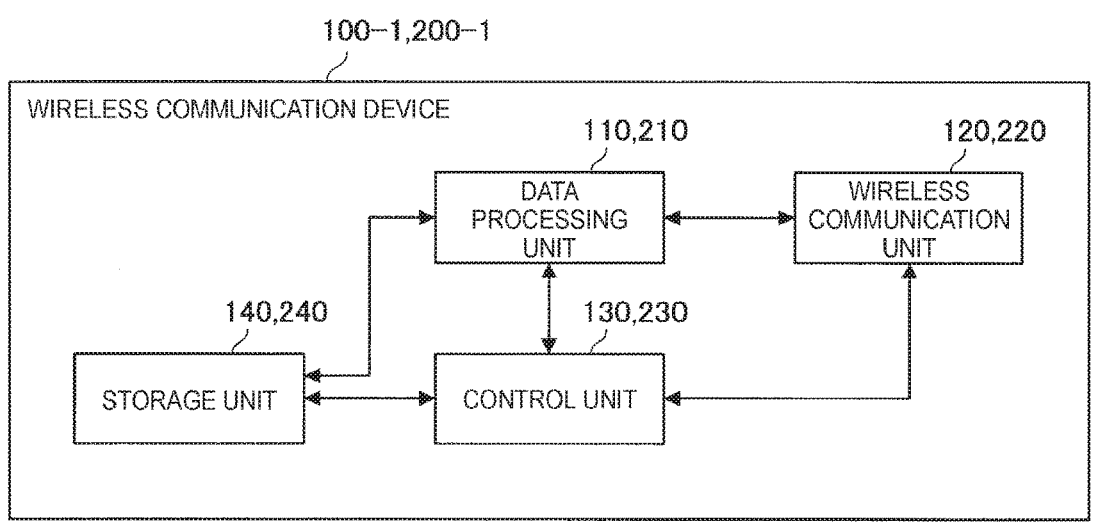
FIG. 4 is a block diagram illustrating an example of a schematic functional configuration of a wireless communication device according to a first embodiment of the present disclosure.

First, a basic functional configuration of the wireless communication device 100-1 (200-1) according to an embodiment of the present disclosure will be described with reference to FIG. 4. FIG. 4 is a block diagram illustrating an example of a schematic functional configuration of the wireless communication device 100-1 (200-1) according to the first embodiment of the present disclosure.

The wireless communication device 100-1 (200-1) includes a data processing unit 110 (210), a wireless communication unit 120 (220), a control unit 130 (230), and a storage unit 140 (240) as illustrated in FIG. 4.

The data processing unit 110 (210) performs a process for transmitting and receiving data as a part of a communication unit. Specifically, the data processing unit 110 (210) generates a frame on the basis of data from an upper communication layer and provides the generated frame to the wireless communication unit 120 (220). For example, the data processing unit 110 (210) generates a frame (packet) from data and performs a process of adding a media access control (MAC) header for MAC control and adding an error detection code to the generated frame, or the like. In addition, the data processing unit 110 (210) extracts data from a received frame and provides the extracted data to an upper communication layer. For example, the data processing unit 110 (210) acquires data by performing analysis of an MAC header, detection and correction of a code error, a reordering process, or the like on the received frame.

The wireless communication unit 120 (220) has a signal processing function, a wireless interface function, and the like as a part of the communication unit.

A signal processing function is a function of performing signal processing such as modulation of a frame. Specifically, the wireless communication unit 120 (220) performs encoding, interleaving, and modulation on a frame provided from the data processing unit 110 (210) in accordance with a coding and modulation scheme or the like set by the control unit 130 (230), and generates a symbol stream by adding a preamble and a physical layer (PHY) header thereto. In addition, the wireless communication unit 120 (220) acquires a frame by performing demodulation, decoding, and the like on a symbol stream obtained through processing of a wireless interface function, and provides the acquired frame to the data processing unit 110 (210) or the control unit 130 (230)

The wireless interface function is a function of performing transmission and reception of a signal via an antenna. Specifically, the wireless communication unit 120 (220) converts a signal related to a symbol stream obtained through processing of the signal processing function into an analog signal, amplifies and filters the analog signal, and up-converts a frequency thereof. Then, the wireless communication unit 120 (220) transmits the processed signal via an antenna. In addition, the wireless communication unit 120 (220) performs processing opposite to the processing performed during signal transmission, for example, down-conversion of a frequency, digital signal conversion, and the like, on the signal obtained from the antenna.

The control unit 130 (230) controls overall operations of the AP 100-1 or the STA 200-1. Specifically, the control unit 130 (230) performs processing such as transfer of information between respective functions, setting of communication parameters, and scheduling of frames of the data processing unit 110 (210).

The storage unit 140 (240) stores information to be used in processing of the data processing unit 110 (210) or the control unit 130 (230). Specifically, the storage unit 140 (240) stores information held in transmission frames, information acquired from received frames, information of communication parameters, and the like.

2-2. Details of Functions of Device

Next, functions of the wireless communication device 100-1 (200-1) according to the first embodiment of the present disclosure will be described in detail.
(A. Functions of AP)
First, functions of the AP 100-1 will be described in detail.
(A-1. Transmission of Multicast Frame)
The AP 100-1 transmits a multicast frame to STAs 200-1. Specifically, when a data transmission request for a plurality of the STAs 200-1 is generated, the control unit 130 causes the data processing unit 110 to generate a multicast frame destined for a multicast group including the plurality of the STAs 200-1. Then, the wireless communication unit 120 transmits the generated multicast frame to the STAs 200-1.
(A-2. Transmission of Measurement End Frame)
The AP 100-1 transmits a measurement instruction frame including measurement instruction information for performing notification of measurement information. Specifically, the AP 100-1 transmits a measurement end frame as a measurement instruction frame. For example, the control unit 130 causes the data processing unit 110 to generate a measurement end frame destined for a multicast group for a multicast frame transmitted by the AP to perform a retransmission process on the corresponding multicast frame. Then, the wireless communication unit 120 transmits the generated measurement end frame.

In addition, measurement instruction information includes at least one of measurement time information, transmission time information of an alert frame serving as a first frame which will be described below, and measurement content information.

First, measurement time information will be described. Measurement time information includes information in which at least one of a measurement start time point, a measurement end time point, and a measurement time length is specified.

Specifically, information in which a measurement start time point or end time point is specified is information in which a measurement start time or end time is specified. For example, in a case in which a measurement end time point is known to the STAs 200-1 or measurement is ended on the basis of reception of a measurement end frame, information in which a measurement start time point is specified is included as the measurement time information. Conversely, in a case in which a measurement start time point is known to the STAs 200-1, information in which a measurement end time point is specified is included as the measurement time information. The measurement start time and end time are, for example, absolute times shared by the AP 100-1 and the STAs 200-1. Note that the measurement start time and end time may be relative times which have, as a reference, a time point at which a specific frame transmitted from the AP 100-1, e.g., the latest frame, is successfully received, or may be times elapsed from the reference time point. The specific frame may be a specific type of frame such as a beacon frame or a multicast frame.

Note that the measurement start time point may be a sequence number of a frame at which measurement is started, rather than a measurement start time. Since the frame at which measurement is started is clearly designated in this case, it is possible to prevent the STAs 200-1 from starting measurement of a different frame.

In addition, information in which a measurement time length is specified is information in which a time length from a start to an end of measurement is specified. For example, in a case in which at least one of a measurement start time point or a measurement end time point is known or measurement is ended on the basis of reception of a measurement end frame, a period that is a measurement subject is specified on the basis of the measurement start time point and end time point, or a reception completion time point of the measurement end frame and the measurement time length.

In addition, measurement time information further includes interval information in which a time interval to measurement resumption is specified. For example, the interval information is information in which a relative time or an elapsed time from a start of measurement or an end of measurement, or an absolute time at which measurement is performed is specified. In this case, measurement can be repeated without repeatedly transmitting the measurement end frame. Thus, communication overhead and a volume of communication can be reduced.

Furthermore, information in which the number of measurement operations is specified may be included in the measurement time information in addition to the interval information. In this case, measurement is repeated only the number of times indicated by the information of the number of measurement operations at time intervals indicated by the interval information. Thus, the STAs 200-1 can be caused to perform measurement as many times as requested by the AP 100-1, and thus useless measurement can be minimized. Thus, power consumption of the STAs 200-1 can also be minimized.

An example of a configuration of measurement time information will be described with reference to FIG. 5. FIG. 5 is a diagram illustrating an example of a configuration of measurement time information according to the present embodiment. The measurement time information includes information in which a measurement start time, a measurement time length, an interval to measurement resumption, and the number of measurement operations are specified as illustrated in FIG. 5. Note that a configuration of the measurement time information is not limited to that of FIG. 5. The measurement time information may include, for example, a measurement end time, instead of or in addition to a measurement time length.

Next, transmission time information of an alert frame will be described. Transmission time information of an alert frame includes information in which a start time point or an end time point of a period in which transmission of an alert frame is permitted (which will also be referred to as transmission permitted period) is specified or information in which a transmission permission time length is specified.

Specifically, information in which a start time point or an end time point of a transmission permitted period of an alert frame is specified is information in which a start time of the transmission permitted period (which will also be referred to as transmission permission start time) or an end time thereof (which will also be referred to as transmission permission end time) is specified. For example, in a case in which a transmission permission end time is known to the STAs 200-1, information in which a transmission permission start time is specified is included. Conversely, in a case in which a transmission permission start time is known to the STAs 200-1, information in which a transmission permission end time is specified is included. The transmission permission start time and the transmission permission end time are, for example, absolute times shared by the AP 100-1 and the STAs 200-1. Note that the transmission permission start time and transmission permission end time may be relative times which have, as a reference, a time at which a measurement end frame transmitted from the AP 100-1 is successfully received, or may be times elapsed from the reference time point.

Note that a start time point of the transmission permitted period may be a sequence number of a frame indicating a start of the transmission permitted period, rather than a start time of the transmission permitted period. Since the start of the transmission permitted period is indicated by the frame in this case, it is possible to prevent the transmission permitted period from being different even if there is a difference in times perceived between the STAs 200-1 or between the STAs 200-1 and the AP 100-1. Thus, occurrence of a collision of an alert frame with another frame can be prevented.

In addition, information in which a transmission permission time length is specified is information in which a time length from a start to an end of the transmission permitted period is specified. For example, in a case in which at least one of a start time point or an end time point of the transmission permitted period is known, a period in which transmission of an alert frame is permitted is specified on the basis of the start time point or the end time point of the transmission permitted period and a transmission permission time length.

An example of a configuration of transmission time information of an alert frame will be described with reference to FIG. 6. FIG. 6 is a diagram illustrating an example of a configuration of transmission time information of an alert frame according to the present embodiment. The transmission time information of an alert frame includes information in which a transmission permission start time and a transmission permission time length are specified as illustrated in FIG. 6. Note that a configuration of the transmission time information of an alert frame is not limited to that of FIG. 6. For example, the transmission time information of an alert frame may also include a transmission permission end time instead of or in addition to a transmission permission time length.

Next, measurement content information will be described. Measurement content information includes reception characteristic information in which an index indicating a reception characteristic to be measured (which will also be referred to as reception characteristic index below) is specified. Specifically, a reception characteristic index is at least one of communication throughput, a frame loss rate (packet loss rate), the number of successfully received multicast frames, and a ratio of a signal amount to a noise amount, an interference amount, or the sum of a noise amount and an interference amount. Note that a ratio of a signal amount to a noise amount, an interference amount, or the sum of a noise amount and an interference amount is a ratio of signal power of a signal desired to be received to noise power, interference power, or the sum of noise power and interference power. For example, the ratio may be a signal-to-noise ratio (SNR), a signal-to-interference ratio (SIR), or a signal-to-interference-plus-noise ratio (SINR).

In addition, the reception characteristic information includes information in which a threshold value of a reception characteristic index is specified. Specifically, a threshold value of at least one of the above-described reception characteristic indexes is included in measurement content information as the reception characteristic information. In a case in which a reception characteristic index value is lower than the threshold value, for example, an alert frame is transmitted from the STAs 200-1. Thus, since the AP 100-1 sets the threshold value, the STAs 200-1 that is caused to transmit an alert frame can be controlled.

Note that the threshold value may be decided in accordance with a measurement time period. Specifically, the threshold value is decided in accordance with a measurement time length. For example, in a case in which a reception characteristic index is the number of successfully received multicast frames, a threshold value of the number of successfully received multicast frames is decided in accordance with a length of the measurement time. The reason for this is that the number of transmitted multicast frames changes in accordance with a length of the measurement time period.

In more detail, in a case in which one second before a measurement end frame is received is a measurement time period, the number of transmitted multicast frames for the one second is a maximum value of the number of multicast frames received by the STAs 200-1. If the measurement time period is lengthened or shortened from one second, the maximum value of the number of receptions increases or decreases accordingly.

Thus, the AP 100-1 decides a threshold value of the number of receptions in accordance with a measurement time length. In this case, by setting a threshold value of a reception characteristic index at which a measurement result changes conforming with a measurement time length which is appropriate for the measurement time length, erroneous evaluation on a reception characteristic index value is prevented. Thus, an STA 200-1 which has an intended reception characteristic can be caused to transmit an alert frame. Note that, although the example in which the reception characteristic index is the number of successfully received multicast frames has been described above, it is desirable that the present configuration be applied even to a case in which the index indicates communication throughput or a frame loss rate.

In addition, the threshold value is decided on the basis of a past reception result of an alert frame. For example, the threshold value is decided on the basis of at least one of ratios of the number of STAs 200-1 which received alert frames to the number of received alert frames from past STAs 200-1 and to the number of STAs 200-1 which belong to a multicast group. Note that a value obtained by selecting or updating a threshold value used in the past is set as a threshold value. In addition, the threshold value is decided on the basis of the threshold value decided previous time or one or a plurality of threshold values decided in the past. Accordingly, there are many cases where communication continues without a significant change in the situation thereof, and thus a threshold value related to a reception characteristic index appropriate for the situation of the communication is easily set. Thus, deficiency and excess of alert frames can be prevented and a proper amount of measurement information for the AP 100-1 can be collected.

Furthermore, a plurality of threshold values may be set for one reception characteristic index. For example, a first threshold value and a second threshold value having a lower reception characteristic index value than the first threshold value are set. In a case in which a reception characteristic index value is lower than the first threshold value, an alert frame is transmitted from the STAs 200-1, and in a case in which a reception characteristic index value is lower than the second threshold value, no alert frame is transmitted. Here, if an alert frame is transmitted from an STA 200-1 having a poor reception characteristic index value to the extent that the value is not appropriate for communication, there is concern of multicast frames being frequently retransmitted for the STAs 200-1. As a result, communication resources such as frequency band widths are strained due to frequent retransmission, and thus communication efficiency deteriorates. With regard to this problem, since transmission of an alert frame is controlled by using a plurality of threshold values according to the present configuration, transmission of an alert frame from an STA 200-1 having a poor reception characteristic index value to the extent that the value is not appropriate for communication is suppressed. Thus, frequent retransmission of multicast frames is suppressed, and communication efficiency can be maintained. Note that an operation of the STA 200-1 will be described in detailed functions of the STA 200-1.

In addition, the threshold value may be decided to a value at which alert frames are likely to be transmitted from all STAs 200-1 serving as destinations of multicast frames. Specifically, the threshold value is set to a sufficiently low value with respect to an expected reception characteristic index value of the STAs 200-1. In addition, a value indicating that no threshold value is set may be set. Furthermore, the threshold value may be omitted.

Furthermore, reception characteristic information includes an identifier of a reception characteristic index. Specifically, an identifier by which at least one of the above-described reception characteristic indexes is specified is included in the measurement content information as reception characteristic information.

In addition, the measurement content information may include information to be used for measurement of a reception characteristic index. Specifically, the information to be used for measurement of a reception characteristic index is information for calculating a reception characteristic index value. For example, in a case in which a reception characteristic index is a packet error rate, the number of packets transmitted from the AP 100-1 is used for calculation of the packet error rate. Information in which the number of transmitted packets is specified is included in the measurement content information.

An example of a configuration of measurement content information will be described with reference to FIG. 7. FIG. 7 is a diagram illustrating an example of a configuration of measurement content information according to the present embodiment. The measurement content information includes information in which an identifier of a reception characteristic index and a threshold value of the reception characteristic index are specified and extra information to be used for calculation of a reception characteristic as illustrated in FIG. 7. Note that a configuration of the measurement content information is not limited to that of FIG. 7. For example, the measurement content information may include a plurality of sets of identifiers of reception characteristic indexes and threshold values of the reception characteristic indexes.

In addition, a measurement instruction frame includes information for generation of reception information in which whether a frame has been received is specified (which will also be referred to as reception instruction information). More specifically, a measurement end frame includes a sequence number of a frame at which determination of whether a frame has been received starts as the reception instruction information. The AP 100-1 requests that whether frames having sequence numbers from the aforementioned sequence number are to be received is included as reception information from the STAs 200-1. Note that reception information is information in a bitmap format (which will also be referred to as bitmapped reception information below).

Furthermore, the measurement end frame may include information in which a size of the reception information is specified as reception instruction information. For example, information in which a size of bitmapped reception information is specified is included in the measurement end frame. Note that a size of the bitmapped reception information is, for example, 2048 bits or smaller.

In addition, the measurement instruction frame may include another type of measurement instruction information. Specifically, the measurement instruction frame includes information in which whether the number of successful retransmission operations is measured is specified (which will also be referred to as successful retransmission times information below) as additional measurement content information. For example, the successful retransmission times information includes an identifier indicating whether the number of frames whose reception failed in first transmission but was successful in retransmission is counted. The number of frames is, in other words, the number of frames whose transmission failure is avoided due to retransmission of the frames. Thus, the number of frames is also considered as an index indicating benefit of the STA 200-1 gained from retransmission control. The index indicating benefit gained from retransmission control is helpful for making retransmission control appropriate. For example, the AP 100-1 excludes an STA 200-1 having a lower reception characteristic index value than that of other STAs 200-1 from subjects of retransmission control, in spite of the fact that the index value is high, i.e., that transmission failure of many frames is avoided due to retransmission. The reason for this is that, if retransmission is controlled on the basis of an STA 200-1 having an inferior reception characteristic, there are possibilities of a frequency of retransmission increasing and traffic being strained due to retransmission.

Furthermore, the successful retransmission times information includes an identifier indicating whether the number of frames whose reception succeeded in first transmission and also succeeded in retransmission is counted. The number of frames is, in other words, the number of received redundant frames. For this reason, the number of frames is also considered as an index indicating a degree of inappropriateness of retransmission control. For example, the AP 100-1 decides content of retransmission control on the basis of whether there is an STA 200-1 that has a high index value, i.e., that has received redundant frames, in spite of the fact that an alert frame including the index value has been transmitted. For example, the AP 100-1 changes the threshold value of the reception characteristic index to an appropriate value on the basis of measurement information included in the alert frame transmitted from the corresponding STA 200-1. Accordingly, the control of the retransmission can become appropriate.

In addition, as another type of measurement instruction information, an identifier indicating whether information indicating a state of an STA 200-1 (which will also be referred to as terminal state information below) is transmitted may be included. Specifically, the terminal state information includes at least one of movement information, position information, and battery information of the STA 200-1. The AP 100-1 performs retransmission control on the basis of the above-described information.

In the case where, for example, an STA 200-1 is determined to be moving in a direction away from the AP 100-1 or a communication range of the AP 100-1 on the basis of at least one of movement information and position information, the AP 100-1 does not perform retransmission of frames based on an alert frame transmitted from the STA 200-1. The reason for this is that there is a possibility of retransmitted frames not being received by the STA 200-1 since the STA 200-1 is moving away from the communication range. Thus, since frames that are not likely to be received are not retransmitted, waste of communication resources can be prevented.

Furthermore, in the case where the AP 100-1 determines that an amount of a battery of the STA 200-1 is smaller than a threshold value on the basis of battery information, for example, the AP 100-1 does not perform retransmission of frames based on an alert frame transmitted from the STA 200-1. The reason for this is that there is a possibility of the STA 200-1 being not capable of receiving transmitted frames due to depletion of the battery. Thus, since frames that are not likely to be received are not retransmitted, waste of communication resources can be prevented.

Figure 8:
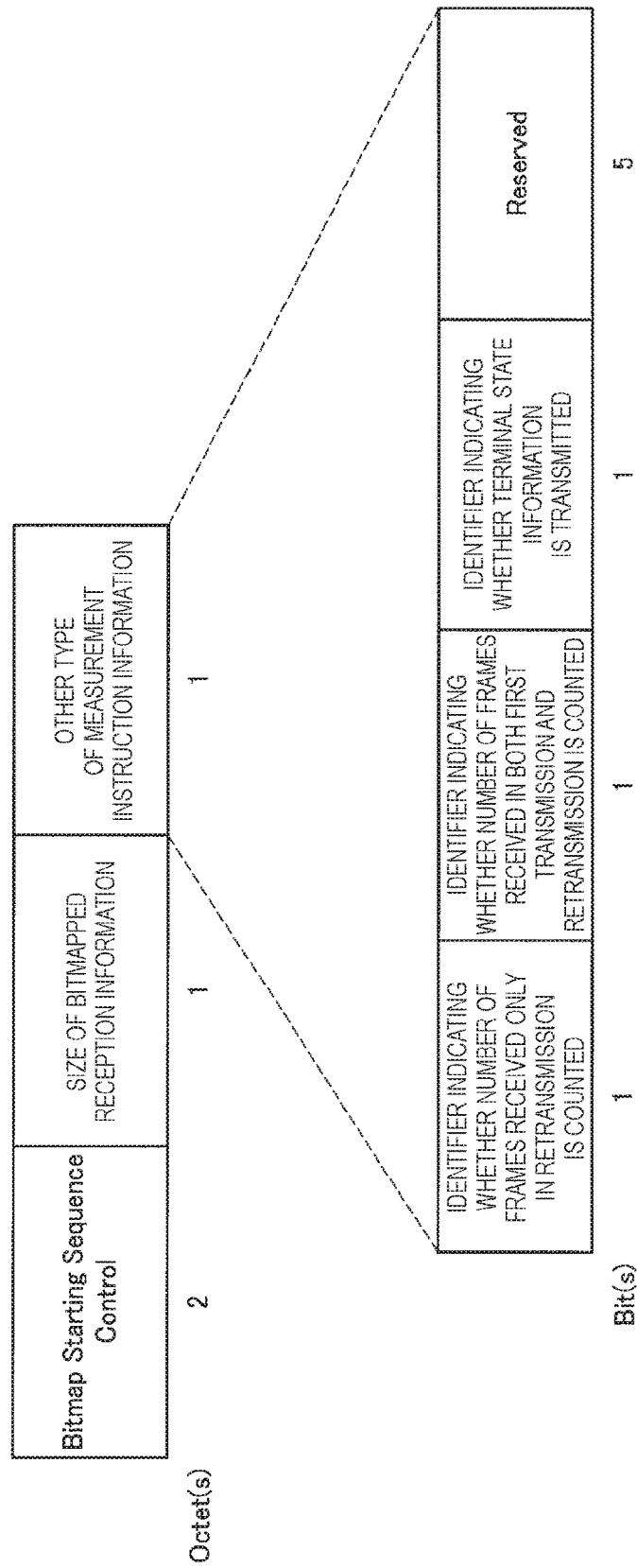
FIG. 8 is a diagram illustrating an example of a configuration of reception instruction information and another type of measurement instruction information according to the present embodiment.

An example of a configuration of reception instruction information and another type of measurement instruction information will be described with reference to FIG. 8. FIG. 8 is a diagram illustrating an example of a configuration of reception instruction information and another type of measurement instruction information according to the present embodiment. Reception instruction information includes Bitmap Starting Sequence Control, a size of bitmapped reception information, and another type of measurement instruction information as illustrated in FIG. 8. The other type of measurement instruction information includes an identifier indicating whether the number of frames received only in retransmission is counted, an identifier indicating whether the number of frames received in both first transmission and retransmission is counted, an identifier indicating whether terminal state information is transmitted, and a reserved region for the future, as illustrated in FIG. 8. Note that a configuration of the reception instruction information and the other type of measurement instruction information is not limited to that illustrated in FIG. 8. For example, either Bitmap Starting Sequence Control or a size of bitmapped reception information may be omitted. In addition, the other type of measurement instruction information may include only some of the above-described three identifiers.

Figure 9:
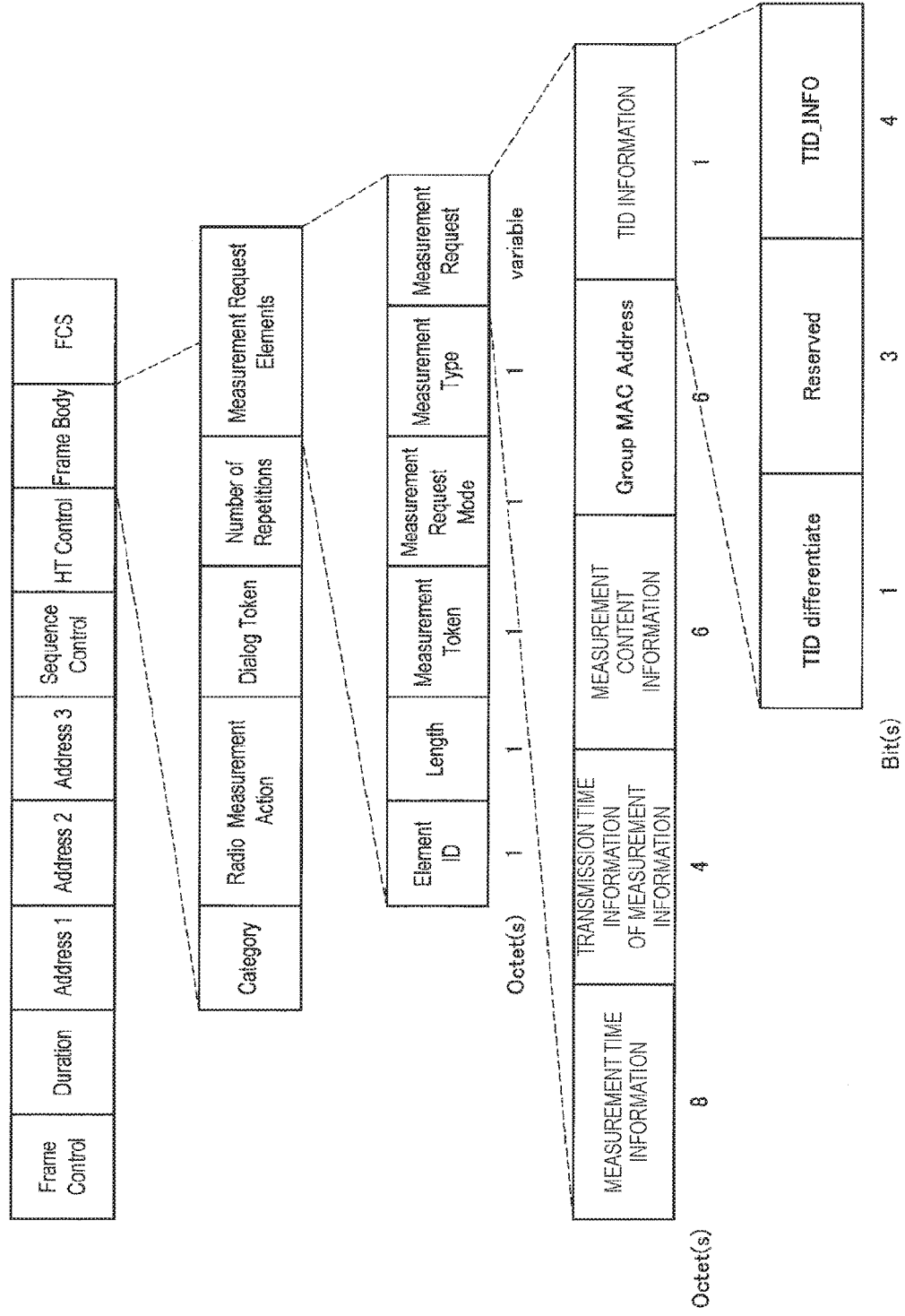
FIG. 9 is a diagram illustrating an example of a configuration of a measurement end frame according to the present embodiment.

Furthermore, a configuration of a measurement end frame will be described with reference to FIG. 9. FIG. 9 is a diagram illustrating an example of a configuration of a measurement end frame according to the present embodiment.

The measurement end frame includes fields of Frame Control, Duration, Address 1 to Address 3, Sequence Control, and HT Control which correspond to a header, Frame Body which corresponds to a payload, and Frame Check Sequence (FCS) as illustrated in FIG. 9. Note that, although the example in which the measurement end frame is a management frame as illustrated in FIG. 9 has been described, it may be another type of frame such as a control frame or a data frame, or may be a subframe included in an aggregation frame. In addition, although the example in which measurement instruction information is included in the payload of the measurement end frame has been described, measurement instruction information may be included in a header thereof.

The Frame Body field includes fields of Category, Radio Measurement Action, Dialog Token, Number of Repetitions, and Measurement Request Elements as illustrated in FIG. 9. Note that, although an example in which a measurement end frame is a measurement request (Measurement Request) frame as illustrated in FIG. 9 is shown, the frame may be another management frame such as a beacon (Beacon) frame.

The Measurement Request Elements field includes fields of Element ID, Length, Measurement Token, Measurement Request Mode, Measurement Type, and Measurement Request as illustrated in FIG. 9. The Measurement Request field stores measurement time information, transmission time information of a measurement time, measurement content information, Group MAC Address, and Traffic Identifier (TID) information.

The field in which TID information is stored includes fields of TID differentiate, Reserved, and TID_INFO. The TID differentiate field stores information indicating whether TID information is distinguished, and the TID_INFO field stores information indicating TID to be distinguished in a case in which TID information is distinguished. Accordingly, in a case in which destinations of multicast frames are the same and there are a plurality of traffics, a target traffic can be selected. Thus, retransmission can be controlled more finely.

(A-3. Retransmission Control Based on Reception of Alert Frame)

The AP 100-1 performs frame retransmission control on the basis of reception of an alert frame. Specifically, the AP 100-1 performs frame retransmission control on the basis of reception information included in an alert frame transmitted on the basis of measurement information. For example, the control unit 130 decides a retransmission candidate frame on the basis of bitmapped reception information included in each alert frame received within a transmission period of the alert frame after the reception period ends. The frame decided as a retransmission candidate is stored in a transmission queue and transmitted when a transmission timing arrives. Note that overlap of transmission candidate frames may be avoided. For example, in a case in which a certain frame is decided as a retransmission frame on the basis of reception bitmap for another STA 200-1 and is already stored in a transmission queue, the AP 100-1 does not decide the certain frame as a transmission frame again.

Note that the control unit 130 may decide a retransmission candidate frame on the basis of bitmapped reception information included in an alert frame each time a corresponding alert frame is received. In this case, a frame is retransmitted without waiting for an end of a transmission period of the alert frame, and thus a delay of a retransmission frame can be minimized. In addition, when a frame that an STA 200-1, which has not transmitted an alert frame, failed to receive before transmission of an alert frame is retransmitted and the retransmitted frame is successfully received, the STA 200-1 transmits an alert frame while updating bitmapped reception information. Thus, overlapping retransmission of the same frame can be prevented and waste of communication resources can also be prevented.

In addition, a retransmitted frame may be transmitted prior to other frames. Specifically, a retransmission frame is processed as a frame of a specific access category. For example, the transmission frame is stored in a transmission queue of an access category with a higher transmission priority than other access categories and processed. Furthermore, the retransmission frame may be immediately processed regardless of transmission order. For example, when retransmission is decided, the retransmission frame is not stored in a transmission queue and a carrier sensing process for transmitting the retransmission frame is performed thereon. Furthermore, a transmission standby time after the carrier sensing process may be omitted. For example, an inter-frame space (IFS) or a back-off time may be omitted, and the retransmission frame is immediately transmitted if a channel state is an idle state.

In addition, the AP 100-1 may perform retransmission control of a frame on the basis of measurement information in addition to reception information. For example, retransmission control based on another type of measurement instruction information such as the above-described successful retransmission times information or terminal state information is performed. Note that retransmission control may be performed on the basis of reception characteristic information. Specifically, the AP 100-1, instead of the STA 200-1, performs comparison of a reception characteristic index value and a threshold value thereof. For example, the AP 100-1 receives alert frames from all of the STAs 200-1 serving as destinations of multicast frames and decides an STA 200-1 that will be a subject of retransmission control on the basis of reception characteristic information included in the alert frames and the threshold value. Then, the AP 100-1 performs retransmission control on the basis of reception information included in the alert frame received from the STA 200-1 decided as a subject of retransmission control.

(B. Details of Functions of STA)

Next, functions of the STA 200-1 will be described in detail.

(B-1. Measurement Regarding Reception of Frame)

The STA 200-1 performs measurement regarding reception of frames. Specifically, before receiving a measurement end frame from the AP 100-1, the STA 200-1 performs measurement in advance and records a measurement result. The measurement result is sequentially updated. For example, the STA 200-1 measures a reception characteristic index value, the number of successful retransmission operations, and the like as described above. In addition, the measurement result is recorded in association with a time stamp. The reason for this is that a measurement period to reception of a measurement end frame from the AP 100-1 is undetermined and the STA 200-1 generates retroactive measurement information after the reception of the measurement end frame.

In addition, the STA 200-1 records whether a frame has been received. Specifically, the STA 200-1 updates bitmapped reception information in accordance with a sequence number of a received frame each time a frame is received.

(B-2. Generation of Measurement Information Based on Reception of Measurement End Frame)

The STA 200-1 generates measurement information on the basis of reception of a measurement end frame. Specifically, upon receiving a measurement end frame, the STA 200-1 generates measurement information on the basis of measurement instruction information included in the measurement end frame. For example, upon receiving a measurement end frame, the control unit 230 specifies a period to be measured on the basis of measurement time information included in the measurement end frame. Next, the control unit 230 generates measurement information on the basis of a measurement result recorded in the specified period. The measurement information may be, for example, a statistical value such as a representative value of the measurement result, or a measurement result such as a measured index value. Furthermore, measurement information will be described in detail with reference to FIG. 10. FIG. 10 is a diagram illustrating an example of a configuration of measurement information according to the present embodiment.

Measurement information includes information regarding a measurement result, reception information, and terminal state information. Measurement information includes, for example, an identifier of a reception characteristic index, a statistical value of the reception characteristic index, the number of frames received only in retransmission, and the number of frames received in both first transmission and retransmission as information regarding a measurement result as illustrated in FIG. 10. In addition, the measurement information includes a start sequence number related to bitmapped reception information and the bitmapped reception information as reception information as illustrated in FIG. 10. Note that a size of the bitmapped reception information is a size designated in measurement instruction information. Furthermore, the measurement information includes terminal state information as illustrated in FIG. 10. Note that a configuration of measurement information is not limited to that illustrated in FIG. 10.

Note that only a part of the measurement information may be generated at this time point, and the whole measurement information may be generated after transmission of an alert frame is decided.

(B-3. Transmission of Alert Frame and Reception of Retransmission Frame)

The STA 200-1 transmits an alert frame as a first frame including reception information on the basis of measurement information. Specifically, the STA 200-1 controls whether an alert frame is to be transmitted on the basis of measurement instruction information and measurement information. More specifically, the control unit 230 determines whether a measured reception characteristic index value (or a statistical value of a reception characteristic index) is lower than a threshold value of a reception characteristic index included in the measurement instruction information. In a case in which the measured reception characteristic index value is determined to be lower than the threshold value, the control unit 230 determines to transmit an alert frame. Note that, in a case in which all or some of a plurality of reception characteristic index values are lower than the threshold value, transmission of an alert frame may be determined.

Note that, in the case in which a plurality of threshold values are set as described above, whether an alert frame is to be transmitted may be determined on the basis of comparison of the plurality of threshold values and an index value. For example, in the case where a reception characteristic index value is a value between a first threshold value and a second threshold value, the control unit 230 determines to transmit an alert frame. In addition, in the case where a reception characteristic index value is higher than the first threshold value or lower than the second threshold value, the control unit 230 determines not to transmit an alert frame.

Figure 11:
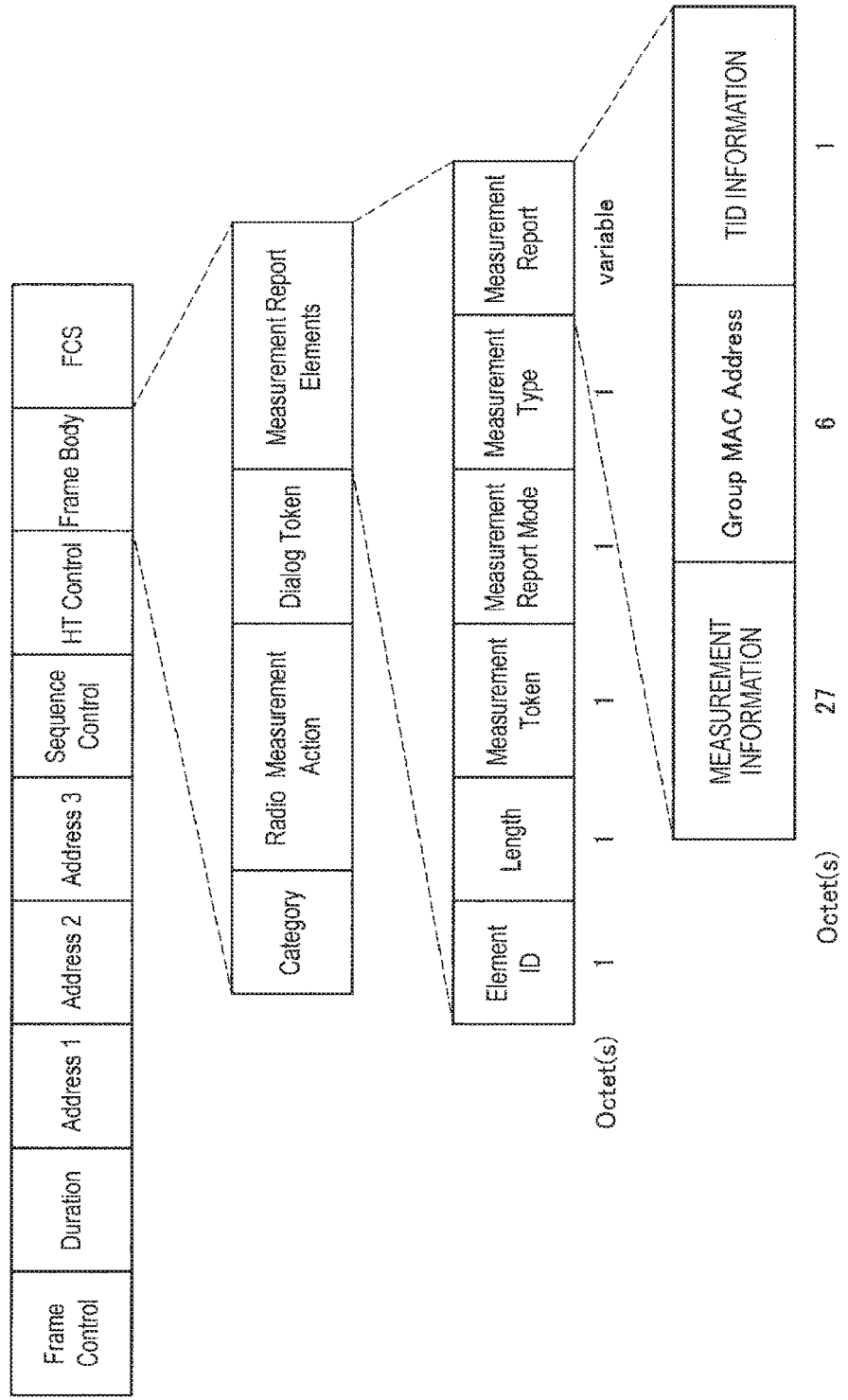
FIG. 11 is a diagram illustrating an example of a configuration of an alert frame according to the present embodiment.

In the case where transmission of an alert frame is determined, the STA 200-1 generates an alert frame. Specifically, upon determining to transmit an alert frame, the control unit 230 causes the data processing unit 210 to generate an alert frame. Further, a configuration of an alert frame will be described with reference to FIG. 11. FIG. 11 is a diagram illustrating an example of a configuration of an alert frame according to the present embodiment.

The alert frame includes fields of Frame Control, Duration, Address 1 to Address 3, Sequence Control, and HT Control which correspond to a header, Frame Body which corresponds to a payload, and FCS as illustrated in FIG. 11. Note that, although the example in which the measurement end frame is a management frame as illustrated in FIG. 10 has been described, the measurement end frame may be another type of frame such as a control frame or a data frame. In addition, although the example in which measurement instruction information is included in the payload of the measurement end frame has been described, the measurement instruction information may be included in the header.

The Frame Body field includes fields of Category, Radio Measurement Action, Dialog Token, and Measurement Report Elements as illustrated in FIG. 11. Note that, although the example in which an alert frame is a measurement report (Measurement Report) frame illustrated in FIG. 11 is shown, an alert frame may be another management frame.

The Measurement Report Elements field includes fields of Element ID, Length, Measurement Token, Measurement Report Mode, Measurement Type, and Measurement Report as illustrated in FIG. 11. The Measurement Report field stores measurement information, Group MAC Address, and TID information.

Figure 12:
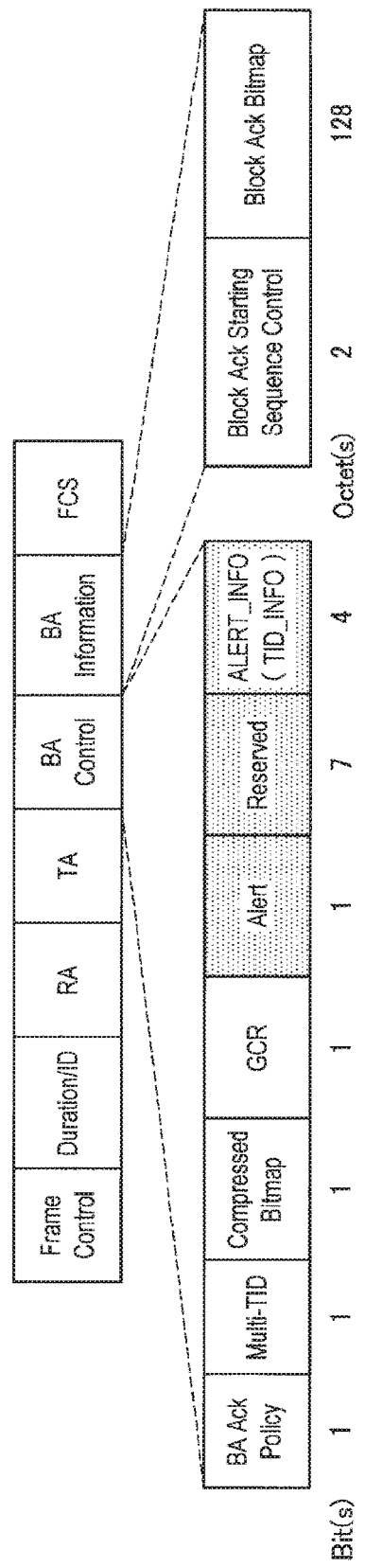
FIG. 12 is a diagram illustrating another example of the configuration of the alert frame according to the present embodiment.

Note that the alert frame may be a BA frame. A configuration of an alert frame using a BA frame will be described with reference to FIG. 12. FIG. 12 is a diagram illustrating another example of the configuration of the alert frame according to the present embodiment.

The alert frame includes fields of Frame Control, RA (Receiver Address), TA (Transmitter Address), BA Control, BA Information, and FCS as illustrated in FIG. 12.

The BA Control field includes fields of BA ACK Policy, Multi-TID, Compressed Bitmap, GCR (Groupcast with Retries), Alert, Reserved, and ALERT_INFO (TID_INFO) as illustrated in FIG. 12. The Alert field stores a value indicating that the corresponding frame is an alert frame.

The ALERT_INFO field provided instead of TID_INFO of a BA frame stores an identifier for specifying a plurality of BA frames belonging to the alert frame in a case in which the alert frame includes the plurality of BA frames. Here, although an existing standard defines an upper limit of a bitmap size that can be stored in a BA frame, there are cases where the AP 100-1 designates a value exceeding the upper limit as a size of bitmapped reception information. In order to deal with this issue, the STA 200-1 transmits the corresponding bitmapped reception information using a plurality of BA frames. In this case, an identifier included in ALERT_INFO is used to specify an alert frame to which the plurality of BA frames belong. Note that the upper limit is, for example, 128 octets.

Note that, in a case in which a plurality of BA frames are transmitted, the BA frames may be subframes of an aggregation frame. The aggregation frame is, for example, an aggregate MAC protocol data unit (A-MPDU) of the BA frames or an aggregate MAC service data unit (A-MSDU) of a set of BA Control and BA Information. In addition, the BA frames may be multiplexed. For example, the BA frames are subjected to time division multiplexing, frequency division multiplexing, or space division multiplexing.

As described above, a range of modification in specifications of an existing standard can be narrowed by using an existing BA frame as an alert frame. Thus, costs for design and manufacturing of the wireless communication system and wireless communication device according to the present embodiment can be reduced.

In addition, the STA 200-1 transmits an alert frame when a transmission time of the alert frame arrives. Specifically, upon determining to transmit an alert frame, the control unit 230 sets a transmission start time of the alert frame on the basis of measurement time information included in a measurement instruction frame. Then, when the set transmission start time arrives, the wireless communication unit 220 starts a transmission process of the alert frame. The control unit 230 randomly sets, for example, a transmission start time from measurement periods specified on the basis of the measurement time information. Then, when the transmission start time arrives, the wireless communication unit 220 starts a carrier sensing process and transmits the alert frame after a transmission standby time elapses. As described above, it is possible to prevent a plurality of the STAs 200-1 from simultaneously transmitting alert frames by randomly setting transmission start times. Thus, collision of the alert frames can be avoided and deterioration in use efficiency of communication resources can be prevented.

2-3. Processes of Devices

Next, processes of the wireless communication device 100-1 (200-1) according to the present embodiment will be described.

(Overview of Process)

Figure 13:
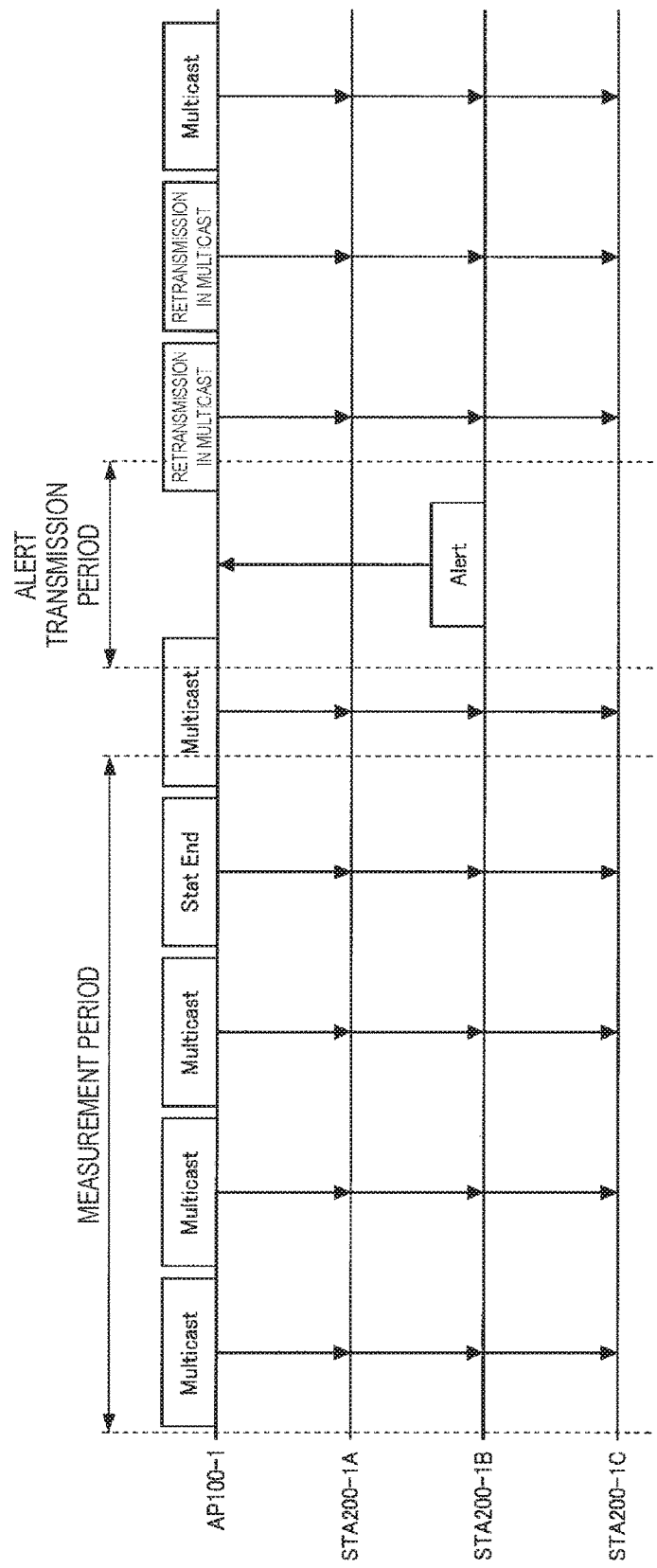
FIG. 13 is a diagram illustrating an example of a frame sequence in a wireless communication system according to the present embodiment.

First, an overview of a process of the wireless communication device 100-1 (200-1) will be described with reference to FIG. 13. FIG. 13 is a diagram illustrating an example of a frame sequence in the wireless communication system according to the present embodiment.

The AP 100-1 transmits multicast frames to STAs 200-1. For example, the AP 100-1 transmits multicast frames to STAs 200-1A to 200-1C as illustrated in FIG. 13.

The STAs 200-1 perform measurement regarding reception of the frames. For example, the STAs 200-1A to 200-1C perform measurement of a reception characteristic index and the like in accordance with a predetermined event, for example, reception of the multicast frames or an elapse of a predetermined period of time.

In addition, upon receiving the multicast frames, the STAs 200-1 update reception information. For example, the STAs 200-1A to 200-1C update bitmapped reception information upon receiving the multicast frames.

Next, the AP 100-1 transmits measurement end frames to the STAs 200-1. For example, the AP 100-1 transmits Stat End frames serving as a measurement end frame including measurement instruction information to the STAs 200-1A to 200-1C that are destinations of the multicast frames, after the transmission of the multicast frames, as illustrated in FIG. 13.

The STAs 200-1 that have received the measurement end frames generate measurement information. For example, upon receiving the Stat End frames, the STAs 200-1A to 200-1C acquire measurement time information included in the Stat End frames, transmission time information of an alert frame, and measurement content information. Then, the STAs 200-1A to 200-1C specify measurement period on the basis of the measurement time information and performs statistical processing on measurement results of a measurement period specified for a reception characteristic index specified from the measurement content information. The measurement information is generated through the statistical processing.

Next, the STAs 200-1 determine whether an alert frame is to be transmitted on the basis of the measurement results. For example, the STAs 200-1A to 200-1C determine whether a statistical value obtained from the statistical processing is lower than a threshold value included in the measurement content information.

When it is determined that an alert frame is to be transmitted, an STA 200-1 transmits an alert frame including the measurement information generated on the basis of the measurement results and the reception information to the AP 100-1 within a transmission period of the alert frame. For example, the STA 200-1B which has determined that the statistical value is lower than the threshold value generates the measurement information and transmits an alert frame including the measurement information and the reception information to the AP 100-1 within an alert transmission period.

The AP 100-1 that has received the alert frame retransmits frames on the basis of the reception of the alert frame. For example, upon receiving the alert frame, the AP 100-1 determines frames to be retransmitted on the basis of the reception information included in the alert frame. Then, the AP 100-1 retransmits the frames determined to be retransmitted as illustrated in FIG. 13.

(Alert Frame Transmission Process of STA)

Figure 14:
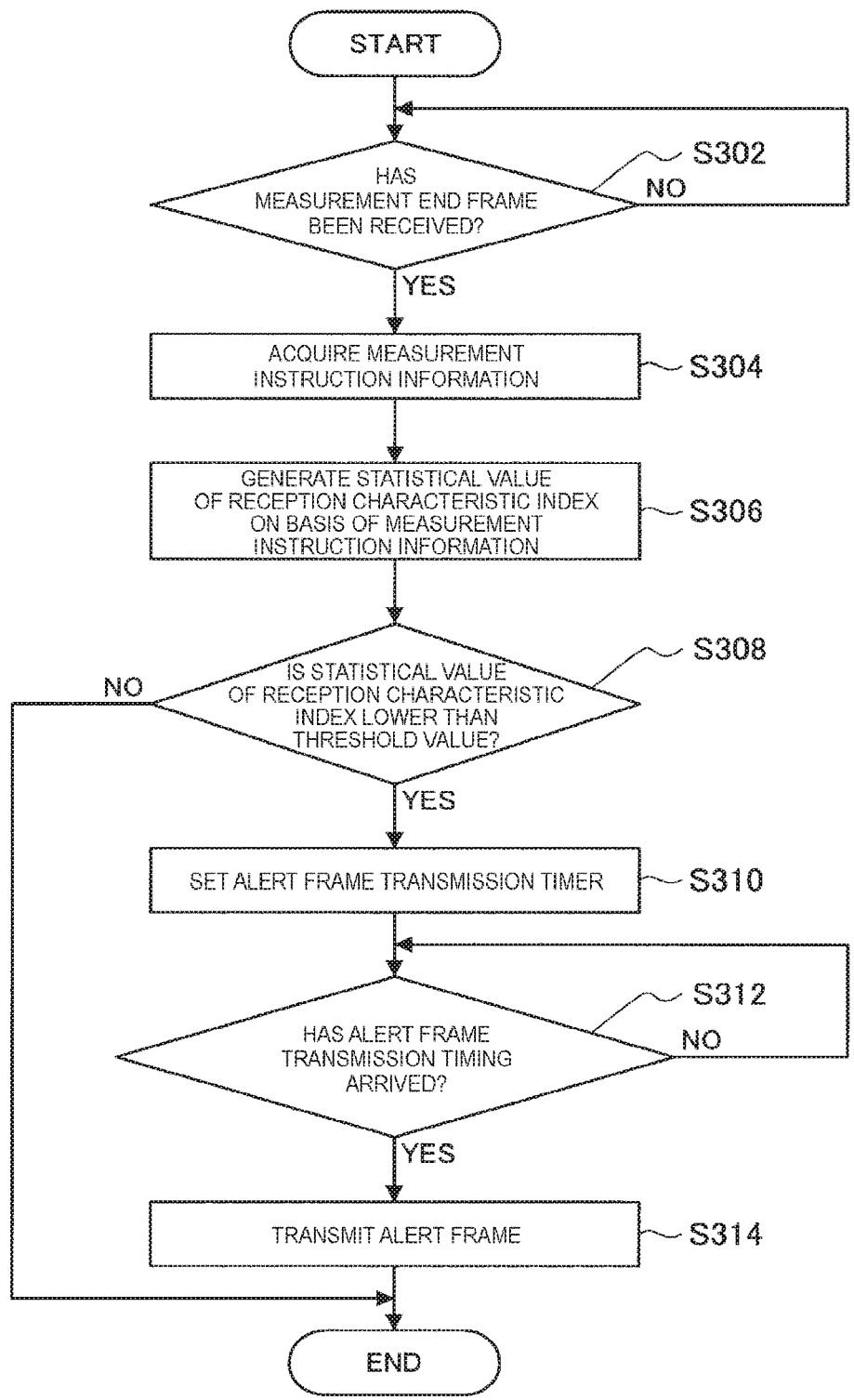
FIG. 14 is a flowchart conceptually showing an alert frame transmission process of an STA according to the present embodiment.

Next, an alert frame transmission process of an STA 200-1 will be described with reference to FIG. 14. FIG. 14 is a flowchart conceptually showing the alert frame transmission process of the STA 200-1 according to the present embodiment.

The STA 200-1 waits for reception of a measurement end frame (Step S302). Specifically, the control unit 230 waits for reception of a measurement end frame while continuing measurement related to reception of a frame until a measurement end frame is received from the AP 100-1.

Upon receiving a measurement end frame, the STA 200-1 acquires measurement instruction information (Step S304). Specifically, upon receiving the measurement end frame, the data processing unit 210 acquires the measurement instruction information including measurement time information, transmission time information of an alert frame, and measurement content information included in the measurement end frame.

Next, the STA 200-1 generates a statistical value of a reception characteristic index on the basis of the measurement instruction information (Step S306). Specifically, the control unit 230 calculates a statistical value from a measurement result of a reception characteristic index or the like within a measurement period specified on the basis of the acquired measurement instruction information.

Next, the STA 200-1 determines whether the statistical value of the reception characteristic index is lower than a threshold value (Step S308). Specifically, the control unit 230 determines whether the calculated statistical value is lower than the threshold value included in the measurement content information.

In the case where the statistical value of the reception characteristic index is determined to be lower than the threshold value, the STA 200-1 sets an alert frame transmission timer (Step S310). Specifically, in the case where the calculated statistical value is determined to be lower than the threshold value, the control unit 230 causes the data processing unit 210 to generate an alert frame. In addition, the control unit 230 randomly decides an alert frame transmission timing within a period specified from the transmission time information of the alert frame. Then, the control unit 230 sets the alert frame transmission timer to the decided alert frame transmission timing.

Next, the STA 200-1 stands by until the alert frame transmission timing arrives (Step S312). Specifically, the wireless communication unit 220 stands by for a transmission process until the alert frame transmission timer indicates the alert frame transmission timing.

When the alert frame transmission timing arrives, the STA 200-1 transmits an alert frame (Step S314). Specifically, when the alert frame transmission timing arrives, the wireless communication unit 220 starts a transmission process of the alert frame and transmits the alert frame to the AP 100-1 through the transmission process.

(Retransmission Control Process of AP)

Figure 15:
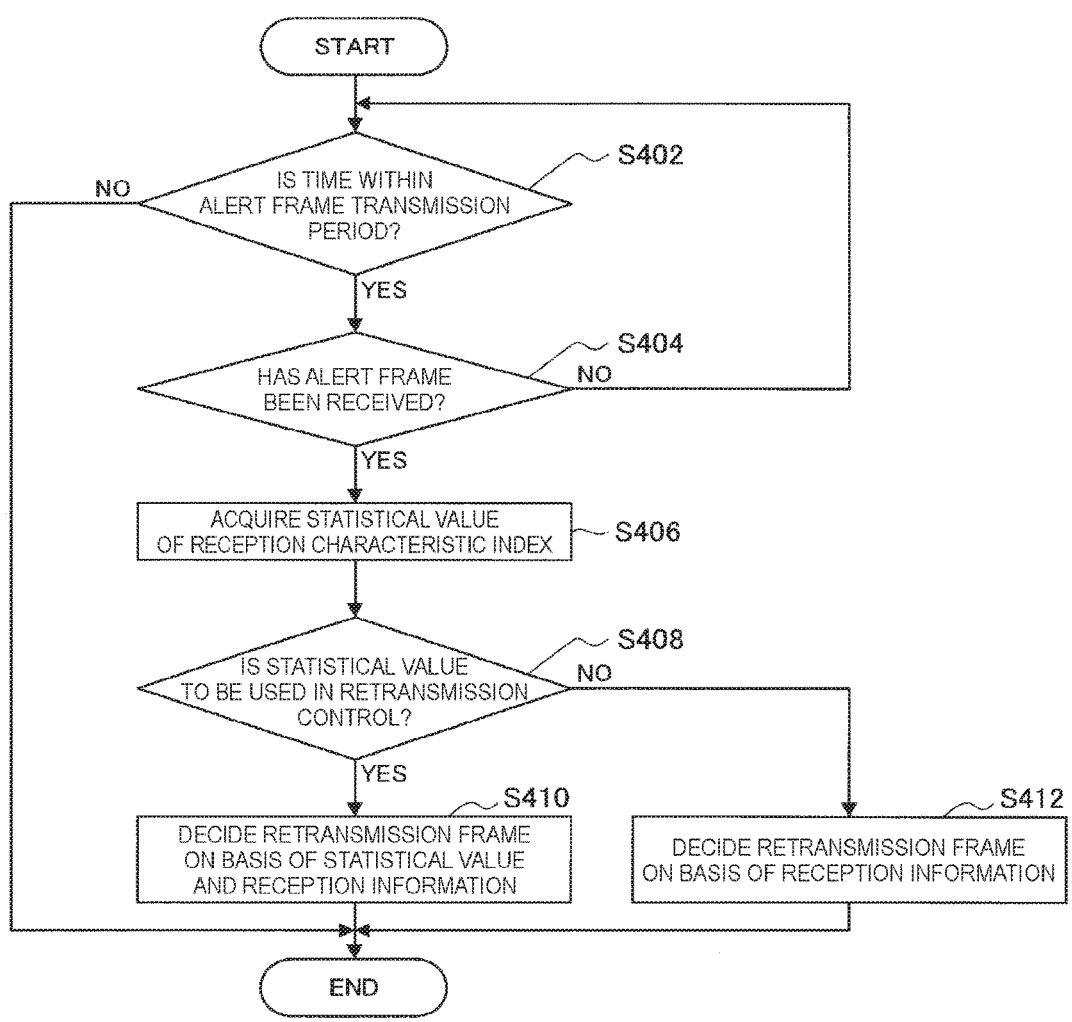
FIG. 15 is a flowchart conceptually showing a retransmission control process of an AP according to the present embodiment.

Next, a retransmission control process of the AP 100-1 will be described with reference to FIG. 15. FIG. 15 is a flowchart conceptually showing a retransmission control process of the AP 100-1 according to the present embodiment.

The AP 100-1 determines whether the time is within an alert frame transmission period (Step S402). Specifically, the control unit 130 determines whether the time is within an alert frame transmission period which the STA 200-1 is notified of.

In the case where it is determined that the time is within the alert frame transmission period, the AP 100-1 waits for reception of an alert frame (Step S404). Specifically, in the case where the time is determined to be within the alert frame transmission period, the control unit 130 causes the wireless communication unit 120 to wait for reception of an alert frame.

Upon receiving an alert frame, the AP 100-1 acquires a statistical value of a reception characteristic index (Step S406). Specifically, upon receiving the alert frame, the data processing unit 110 acquires measurement information including the statistical value of the reception characteristic index and the like and reception information from the alert frame.

Next, the AP 100-1 determines whether the acquired statistical value is to be used in retransmission control (Step S408). Specifically, the control unit 130 determines whether retransmission control is to be performed using the acquired statistical value such as successful retransmission times information.

In the case where the statistical value is determined to be used in retransmission control, the AP 100-1 decides retransmission frames on the basis of the statistical value and the reception information (Step S410). Specifically, in the case where retransmission control is determined to be performed using the statistical value, the control unit 130 extracts frames indicated as not having been received from bit-mapped reception information. Then, the control unit 130 decides a frame which has not been received by the STA 200-1 and determined to be a subject of retransmission control from the statistical value among the extracted frames as a frame to be retransmitted.

In addition, in the case where the statistical value is determined not to be used in retransmission control in Step S408, the AP 100-1 decides retransmission frames on the basis of only the reception information (Step S412).

Then, the AP 100-1 retransmits the frames decided as retransmission subjects.

2-4. Summary of First Embodiment

According to the first embodiment of the present disclosure, the AP 100-1 receives the first frame including reception information in which whether a frame has been received is specified transmitted on the basis of measurement information regarding reception of the frame and performs retransmission control of frames on the basis of the reception information as described above. In addition, the STA 200-1 transmits the first frame including the reception information in which whether a frame has been received is specified on the basis of the measurement information regarding reception of a frame. Thus, the AP 100-1 can obtain the reception information from the STAs 200-1 without performing communication with the individual STAs 200-1 such as exchange of BAR frames and BA frames of the past. Thus, communication efficiency can be improved while reliability in communication is maintained in comparison to a case in which a block ACK mechanism of the past is used.

In addition, the first frame includes the measurement information, and the AP 100-1 performs retransmission control of frames on the basis of the measurement information and the reception information. Thus, by more appropriately selecting the frames to be retransmitted in accordance with measurement results of the STAs 200-1, use efficiency of communication resources for frame retransmission can be improved.

Furthermore, the AP 100-1 transmits a measurement instruction frame including measurement instruction information to be used to perform notification of the measurement information. Thus, by notifying the STAs 200-1 of the measurement instruction information, measurement conditions of the STAs 200-1 are unified. Accordingly, whether an alert frame is to be transmitted is decided on the basis of measurement performed under the same condition and evaluation on the measurement results. Thus, inequalities between the STAs 200-1 in retransmission of frames can be minimized.

In addition, the measurement instruction information includes at least one of measurement time information, transmission time information of the first frame, and measurement content information. Thus, by specifically performing notification of a measurement condition, mismatches in measurement conditions between the STAs 200-1 can be reliably reduced.

Furthermore, the measurement time information includes information in which at least one of a measurement start time point, a measurement end time point, and a measurement time length is specified. Thus, by performing notification of information for specifying a measurement period, a possibility of measurement periods deviating from each other between the STAs 200-1 can be lowered. Therefore, fairness in evaluation of measurement results can be ensured.

In addition, the transmission time information of the first frame includes information in which a start time point or an end time point of a period in which transmission of the first frame is permitted is specified or information in which a transmission permission time length is specified. Thus, by performing notification of an alert frame transmission period, unevenness in transmission timings of alert frames transmitted respectively by the STAs 200-1 can be minimized. Therefore, the AP 100-1 can efficiently collect alert frames.

Furthermore, the measurement content information includes reception characteristic information in which an index indicating at least one reception characteristic among communication throughput, a frame loss rate, the number of successfully received multicast frames, and a ratio of a signal amount to a noise amount, an interference amount, or the sum of a noise amount and an interference amount, all of which are measurement subjects, is specified. Here, a frame reception success rate changes in accordance with a reception characteristic in general. For this reason, since an STA 200-1 is caused to transmit an alert frame in accordance with a reception characteristic index value as in the present configuration, the alert frame can be easily received from only the STA 200-1 that is preferable for retransmission of the frame. Therefore, deficiency and excess of alert frames can be prevented, and use efficiency of communication resources can be improved.

In addition, the reception characteristic information includes information in which a threshold value of the index indicating the reception characteristic is specified. Thus, an STA 200-1 that will be caused to transmit an alert frame can be decided as the AP 100-1 decides details of a setting of the threshold value or whether the threshold value has been set.

Furthermore, the measurement instruction frame further includes information in which a sequence number of a frame at which determination of whether a frame has been received starts or a size of the reception information is specified. Thus, the AP 100-1 can obtain the reception information regarding a desired frame from the STAs 200-1. Thus, a size of the reception information becomes appropriate, and use efficiency of communication resources can be improved.

In addition, the measurement instruction frame includes at least one of a management frame including a measurement request frame or a beacon frame, a control frame, a data frame, and a subframe included in an aggregation frame. Thus, by notifying the STAs 200-1 of the measurement instruction information using existing frames, a scale of modification of the existing standard and the wireless communication device can be narrowed. Accordingly, the configuration according to the present embodiment can be easily applied.

Furthermore, the measurement instruction frame includes a measurement end frame for performing notification of an end of measurement. Thus, measurement information can be obtained without notifying the STAs 200-1 of a start of measurement using communication. Therefore, use efficiency of communication resources can be improved.

In addition, the STAs 200-1 receive measurement instruction frames including the measurement instruction information and perform control of whether the first frame is to be transmitted on the basis of the measurement instruction information and the measurement information. Thus, since an alert frame is transmitted from only the STA 200-1 that is desired to transmit an alert frame, strain of communication resources or the like can be minimized.

Furthermore, the measurement information is included in the payload or the header of the first frame. Thus, in the case in which the measurement information is included in the payload, it is possible to design that, even if a size of the measurement information increases, it does not affect a time taken to process the header of an alert frame. In addition, in the case in which the measurement information is included in the header, an acquisition process of the measurement information can be sped up.

In addition, the first frame includes at least one of a management frame including a measurement report frame, a control frame including a block ACK frame, a data frame, and a subframe included in an aggregation frame. Thus, by notifying the AP 100-1 of the measurement information using existing frames, a scale of modification of the existing standard and the wireless communication device can be narrowed. Accordingly, the configuration according to the present embodiment can be easily applied.

3. SECOND EMBODIMENT OF PRESENT DISCLOSURE (EXAMPLE IN WHICH MEASUREMENT START AND MEASUREMENT END FRAMES ARE USED)

The wireless communication device 100-1 (200-1) according to the first embodiment of the present disclosure has been described above. Next, a wireless communication device 100-2 (200-2) according to a second embodiment of the present disclosure will be described. In the present embodiment, both a measurement start frame and a measurement end frame are used as measurement instruction frames.

3-1. Details of Functions of Device

Functions of the wireless communication device 100-2 (200-2) according to the second embodiment of the present disclosure will be described in detail.
(A. Function of AP)
First, a function of an AP 100-2 will be described in detail.
(A-4. Transmission of Measurement Start Frame and Measurement End Frame)

The AP 100-2 transmits a measurement start frame for performing notification of a start of measurement as a measurement instruction frame. Specifically, in the case where a measurement request toward an STA 200-2 regarding reception of a frame is generated, the control unit 130 causes a data processing unit 110 to generate a measurement start frame including measurement instruction information. Then, a wireless communication unit 120 transmits the generated measurement start frame to the STA 200-2. In addition, the AP 100-2 transmits a measurement end frame as in the first embodiment.

Note that the measurement start frame may have a similar frame configuration to or a different frame configuration from the above-described measurement end frame. For example, the measurement start frame include measurement time information only, and transmission time information of an alert frame and measurement content information are included in the measurement end frame.

In addition, the measurement time information included in the measurement start frame may only be the above-described interval information. The reason for this is that the STA 200-2 calculates a measurement time length using the measurement start frame and the measurement end frame and specifies a measurement period on the basis of the calculated measurement time length and the interval information. In this case, the measurement start frame and the measurement end frame may not be repeatedly transmitted after the frames are transmitted one time. Thus, communication resources can be utilized in other types of communication and use efficiency of the communication resources can be improved.

Furthermore, in a case in which the measurement start frame and the measurement end frame are repeatedly transmitted, the frames may include no transmission time information. The reason for this is that measurement can be started and ended on the basis of reception of the measurement start frame and the measurement end frame. Thus, a size of the measurement instruction frame can be reduced.

Furthermore, in this case, an existing frame may be used as a measurement start frame. For example, an identifier indicating being a measurement start frame or the like is stored in an MAC header or the like of a multicast frames, and the STA 200-2 determines whether the multicast frame is a measurement start frame in accordance with the presence or content of the identifier.

(B. Details of Functions of STA)

Next, functions of the STA 200-2 will be described in detail.

(B-4. Measurement Based on Reception of Measurement Start Frame)

The STA 200-2 starts measurement regarding reception of a frame on the basis of reception of a measurement start frame. Specifically, in a case in which the measurement start frame includes measurement time information, the STA 200-2 starts measurement of a reception characteristic index value, the number of successful retransmission operations, and the like as described above on the basis of the measurement time information upon receiving the measurement start frame. In a case in which the measurement start frame does not include measurement time information, the STA 200-2 starts measurement when reception of the measurement start frame is completed.

Note that measurement information may be generated on the basis of a measurement result and the measurement information may be updated each time a measurement result is obtained. In addition, measurement may be performed regardless of whether a measurement start frame has been received, and processes regarding measurement may be performed having a period from the reception of the measurement start frame to reception of a measurement end frame as a measurement period.

(B-5. Error Processing Regarding Measurement)

The STA 200-2 controls transmission of an alert frame by controlling a measurement process on the basis of whether the measurement start frame and the measurement end frame have been received. Specifically, the STA 200-2 performs control of whether an alert frame including measurement information, which is generated on the basis of reception of the measurement start frame or the measurement end frame, is to be transmitted on the basis of whether the measurement start frame and the measurement end frame have been received.

More specifically, in a case in which the measurement end frame is received with no measurement start frame received, the STA 200-2 stops transmitting an alert frame based on the reception of the measurement end frame. For example, in the case in which the measurement end frame is received with no measurement start frame received, the data processing unit 210 discards the measurement end frame.

In addition, in a case in which no measurement end frame is received after the measurement start frame is received, the STA 200-2 stops transmitting an alert frame based on the measurement start frame. For example, in the case in which no measurement end frame is received until a predetermined period of time elapses from reception of the measurement start frame, the control unit 230 stops the measurement process based on the measurement start frame. For example, a measurement result or measurement information is initialized or discarded.

Furthermore, in a case in which another measurement start frame is received again before the measurement end frame is received after the measurement start frame is received, the STA 200-2 transmits an alert frame including measurement information generated through measurement performed based on the measurement start frame received again. For example, in a case in which another measurement start frame is received again with no measurement end frame received until a predetermined period of time elapses from reception of the measurement start frame, the control unit 230 performs a measurement process again on the basis of the measurement start frame received later.

Note that information indicating association of a measurement start frame and a measurement end frame may be included in each of the measurement start frame and the measurement end frame. In this case, even if a plurality of measurement start frames and measurement end frames are transmitted, corresponding frames can be distinguished from each other.

3-2. Process of Device

Next, a process of the wireless communication device 100-2 (200-2) according to the present embodiment will be described. Note that description of substantially the same process as the above-described process will be omitted.

(Overview of Process)

Figure 16:
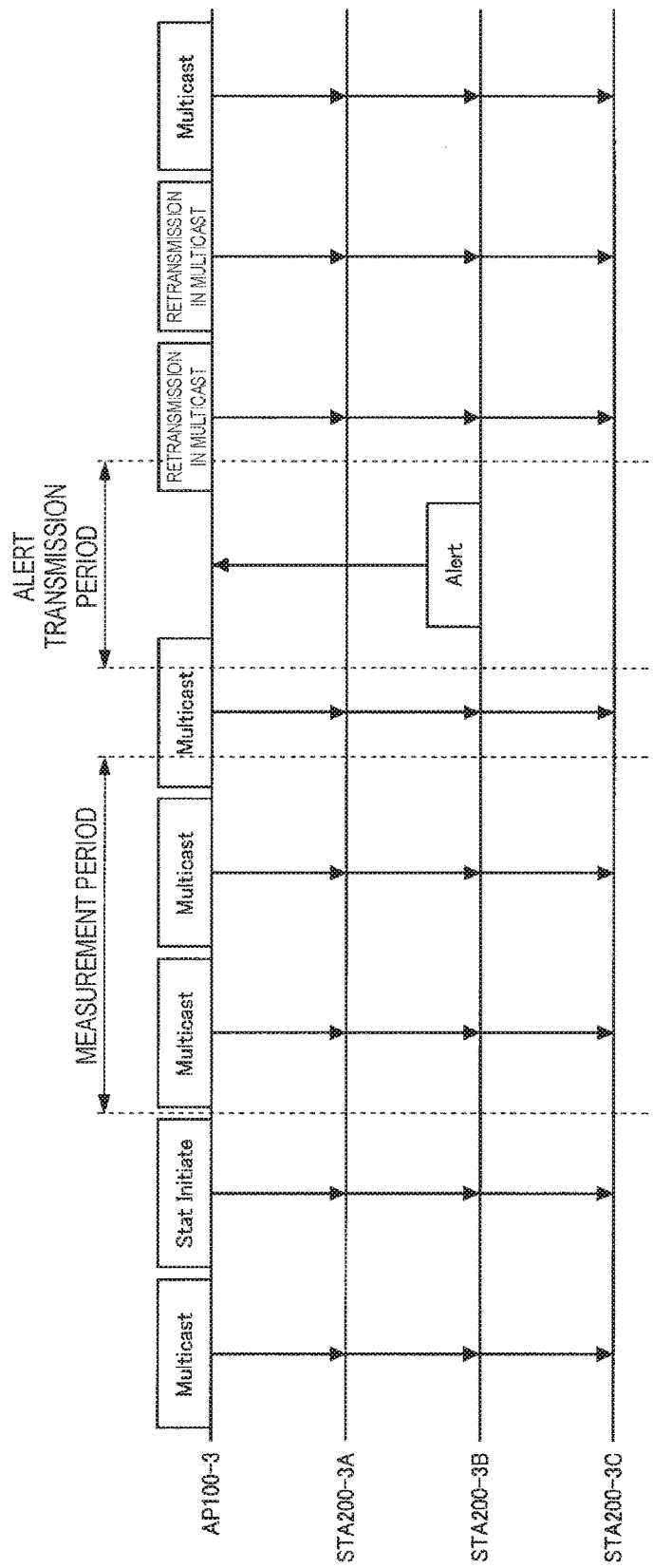
FIG. 16 is a diagram illustrating an example of a frame sequence in the wireless communication system according to the present embodiment.

First, an overview of the process of the wireless communication device 100-2 (200-2) will be described with reference to FIG. 16. FIG. 16 is a diagram illustrating an example of a frame sequence in a wireless communication system according to the present embodiment.

The AP 100-2 transmits measurement start frames to STAs 200-2. For example, the AP 100-2 transmits Stat Initiate frames that are the measurement start frames to the STAs 200-2A to 200-2C serving as destinations of multicast frames as illustrated in FIG. 16.

The STAs 200-2 perform measurement regarding reception of the frames on the basis of the reception of the measurement start frames. For example, upon receiving the Stat Initiate frames, the STAs 200-2A to 200-2C start measurement of a reception characteristic index and the like. Note that reception information is also generated and updated.

Next, the AP 100-2 transmits measurement end frames to the STAs 200-2 after the transmission of the multicast frames. For example, after transmitting the multicast frames to the STAs 200-2A to 200-2C, the AP 100-2 transmits Stat End frames to the STAs 200-2A to 200-2C serving as destinations of the Stat Initiate frames as illustrated in FIG. 16.

The STAs 200-2 that have received the measurement end frames generate measurement information. For example, upon receiving the Stat End frames, the STAs 200-2A to 200-2C perform statistical processes for measurement results obtained from the reception of the Stat Initiate frames to the reception of the Stat End frames. The measurement information is generated through the statistical processes.

Next, the STAs 200-2 determine whether an alert frame is to be transmitted on the basis of the measurement results, and in the case where it is determined to transmit an alert frame, one of the STAs transmits an alert frame including the measurement information and reception information to the AP 100-2 within a transmission period of the alert frame.

The AP 100-2 that has received the alert frame retransmits frames on the basis of the reception of the alert frame.

(Alert Frame Transmission Process of STA)

Figure 17:
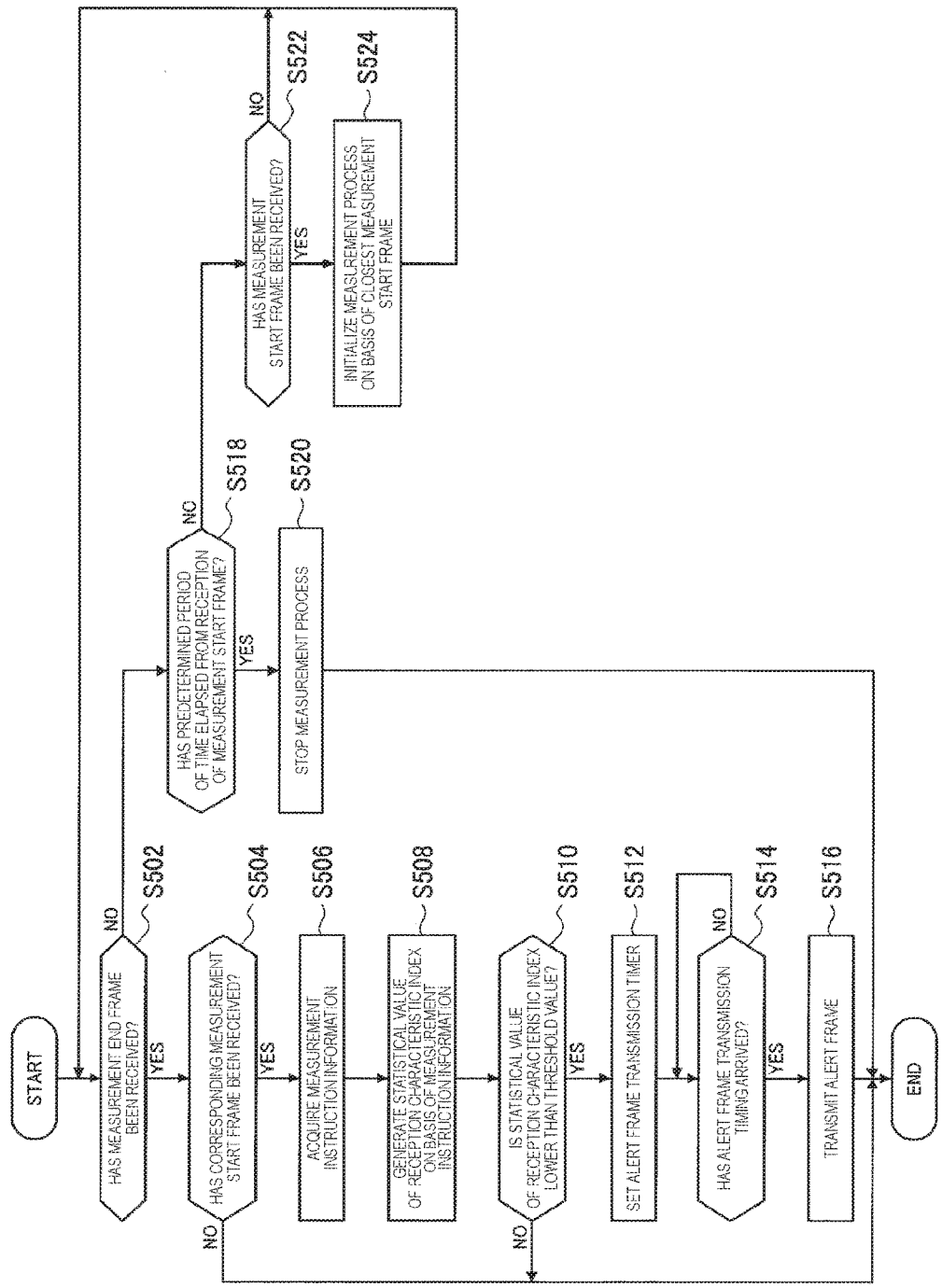
FIG. 17 is a flowchart conceptually showing an alert frame transmission process of an STA according to the present embodiment.

Next, an alert frame transmission process of the STA 200-2 will be described with reference to FIG. 17. FIG. 17 is a flowchart conceptually showing the alert frame transmission process of the STA 200-2 according to the present embodiment.

The STA 200-2 determines whether a received frame is a measurement end frame (Step S502). Specifically, upon receiving the frame, the control unit 230 determines whether the frame is a measurement end frame.

In the case where it is determined that a measurement end frame has been received, the STA 200-2 determines whether a corresponding measurement start frame has been received (Step S504). Specifically, upon receiving the measurement end frame, the control unit 230 determines whether a measurement start frame corresponding to the measurement end frame had been received.

In the case where it is determined that the corresponding measurement start frame has been received, the STA 200-2 performs the processes of Steps S506 to S516 that are substantially the same as Steps S304 to S314 described with reference to FIG. 14.

In the case where it is determined that the corresponding measurement start frame has not been received in Step S504, the STA 200-2 ends the process.

In addition, in the case where the received frame is determined not to be a measurement end frame in Step S502, the STA 200-2 determines whether a predetermined period of time has elapsed from the reception of the measurement start frame (Step S518). Specifically, the control unit 230 causes a timer to activate when the measurement start frame is received and determines whether the timer indicates an elapse of the set predetermined period of time.

In the case where the predetermined period of time is determined to have elapsed from the reception of the measurement start frame, the STA 200-2 stops the measurement process (Step S520). Specifically, in the case where the timer is determined to indicate that the predetermined period of time has elapsed from the reception of the measurement start frame, the control unit 230 stops the measurement process based on the reception of the measurement start frame.

In addition, in the case where it is determined that the predetermined period of time has not elapsed from the reception of the measurement start frame in Step S518, the STA 200-2 determines whether the received frame is a measurement start frame (Step S522). Specifically, the control unit 230 determines whether a measurement start frame has been received again before the predetermined period of time elapses from the reception of the previous measurement start frame.

In the case where the received frame is determined to be a measurement start frame, the STA 200-2 initializes the measurement process on the basis of the closest measurement start frame (Step S524). Specifically, in the case where measurement start frame has been received again before the predetermined period of time elapses from the reception of the previous measurement start frame, the control unit 230 switches to a measurement process based on the measurement start frame received later.

3-3. Summary of Second Embodiment

As described above, according to the second embodiment of the present disclosure, the AP 100-2 transmits measurement start frames for notifying STAs of a start of measurement and above-described measurement end frames. Thus, by being notified of a measurement start time point through the measurement start frames, the STAs 200-2 may start measurement from the measurement start time point that the STAs are notified of Thus, the STAs 200-2 may not perform normal measurement and recording of measurement results. As a result, processing loads and power consumption of the STAs 200-2 can be reduced.

In addition, the STAs 200-2 perform control of whether an alert frame including measurement information generated on the basis of reception of a measurement start frame or a measurement end frame is to be transmitted on the basis of whether the measurement start frame and the measurement end frame have been received. Thus, in a case in which mismatch between the measurement start frame and the measurement end frame occurs, measurement that the AP 100-2 does not expect can be prevented from being performed. Thus, a possibility of measurement information and reception information different from the expectation of the AP 100-2 being transmitted can be lowered and erroneous retransmission control can be minimized.

Furthermore, in the case in which a measurement end frame is received with no measurement start frame received, the STAs 200-2 stop transmission of an alert frame based on the reception of the measurement end frame. Thus, insufficient measurement information and reception information generated in a state in which no measurement is performed can be prevented from being transmitted to the AP 100-2. Therefore, erroneous retransmission control can be minimized.

In addition, in the case in which no measurement end frame is received after the measurement start frame is received, the STAs 200-2 stop transmission of an alert frame based on the measurement start frame. Thus, it is possible to prevent measurement from being continued with no end in a case in which no measurement end frame is successfully received. Therefore, in this case, increases in processing loads and power consumption of the STAs 200-2 can be suppressed.

Furthermore, in the case in which another measurement start frame is received again before the measurement end frame is received after the measurement start frame is received, the STAs 200-2 transmits an alert frame including measurement information generated through measurement performed based on the measurement start frame received again. Thus, in a case in which the next measurement period starts with the previous measurement end frame that has not been successfully received, it is possible to prevent measurement information and reception information from being transmitted to the AP 100-2 in a different period from the measurement period that the AP 100-2 expects. In addition, it is possible to prevent the STAs 200-2, which have received or not received measurement end frames, from having next measurement periods that are different from each other. Thus, since the STAs 200-2 perform the above-described processes, erroneous retransmission control can be minimized without performing additional communication.

4. THIRD EMBODIMENT OF PRESENT DISCLOSURE (EXAMPLE IN WHICH ONLY MEASUREMENT START FRAME IS USED)

The wireless communication device 100-2 (200-2) according to the second embodiment has been described above. Next, a wireless communication device 100-3 (200-3) according to a third embodiment of the present disclosure will be described. In the present embodiment, only a measurement start frame is used as a measurement instruction frame.

4-1. Details of Functions of Device

Functions of the wireless communication device 100-3 (200-3) according to the third embodiment of the present disclosure will be described in detail.

(A. Function of AP)

First, a function of an AP 100-3 will be described in detail.

(A-5. Transmission of Measurement Start Frame)

The AP 100-3 transmits a measurement start frame. Specifically, the measurement start frame includes measurement time information, transmission time information of an alert frame, and measurement content information, similarly to the measurement end frame of the first embodiment. Note that the measurement time information is, for example, information in which a measurement end time or a measurement time length is specified. In addition, no measurement end frame is transmitted.

In addition, the AP 100-3 estimates a threshold value of a reception characteristic index used as measurement content information of measurement instruction information included in the measurement start frame. The reason for this is that the measurement start frame including information in which the threshold value is specified is transmitted to STAs 200-3 before multicast frames are transmitted. Specifically, the control unit 130 estimates the number of multicast frames to be transmitted within a designated measurement period to decide a threshold value of the number of successfully received multicast frames of the reception characteristic index. For example, the control unit 130 decides the threshold value of the number of successfully received multicast frames on the basis of Traffic Specification (TSPEC) indicating characteristics of traffic of multicast frames and a measurement time length.

(B. Details of Function of STA)

Next, a function of the STAs 200-3 will be described in detail.

(B-6. Measurement Based on Reception of Measurement Start Frame)

The STA 200-3 starts measurement regarding reception of frames on the basis of reception of measurement start frames. Specifically, upon receiving the measurement start frame, the STAs 200-3 starts measuring the above-described reception characteristic index value, the number of successful retransmission operations, and the like on the basis of measurement time information included in the measurement start frames.

4-2. Process of Device

Next, a process of the wireless communication device 100-3 (200-3) according to the present embodiment will be described. Note that description of substantially the same process as the above-described process will be omitted.

(Overview of Process)

Figure 18:
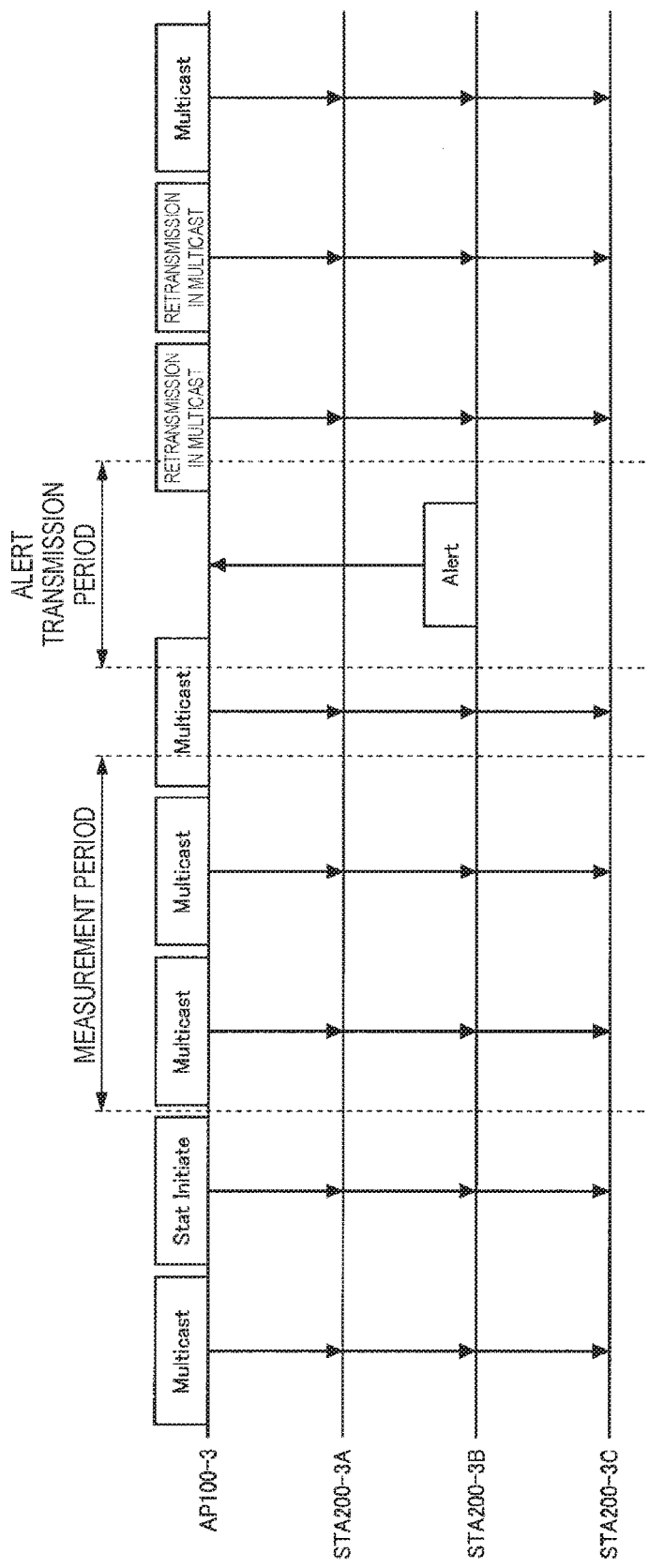
FIG. 18 is a diagram illustrating an example of a frame sequence in the wireless communication system according to the present embodiment.

An overview of the process of the wireless communication device 100-3 (200-3) will be described with reference to FIG. 18. FIG. 18 is a diagram illustrating an example of a frame sequence in a wireless communication system according to the present embodiment.

The AP 100-3 transmits measurement start frames to the STAs 200-3. For example, as illustrated in FIG. 18, the AP 100-3 transmits Stat Initiate frames to the STAs 200-3A to 200-3C serving as destinations of multicast frames.

The STAs 200-3 perform measurement regarding reception of frames on the basis of the reception of the measurement start frames. For example, upon receiving the Stat Initiate frames, the STAs 200-3A to 200-3C starts measurement of a reception characteristic index and the like. In addition, a measurement period is specified on the basis of measurement time information included in the Stat Initiate frames.

Next, when the measurement period ends, the STAs 200-3 generate measurement information. For example, when a measurement end time arrives, the STAs 200-3A to 200-3C perform statistical processing on measurement results obtained in the period from the reception of the Stat Initiate frames to the measurement end time. The measurement information is generated through the statistical processing.

Next, the STAs 200-3 determine whether an alert frame is to be transmitted on the basis of the measurement results, and in the case where it is determined to transmit an alert frame, an alert frame including the measurement information and reception information is transmitted to the AP 100-3 within an alert frame transmission period.

The AP 100-3 that has received the alert frame retransmits frames on the basis of the reception of the alert frame.

4-3. Summary of Third Embodiment

As described above, according to the third embodiment of the present disclosure, the AP 100-3 transmits only the above-described measurement start frames. Thus, the STAs 200-2 does not necessarily perform normal measurement and recording of the measurement results as in the second embodiment. Furthermore, since no measurement end frame is transmitted, communication overhead for retransmission of frames can be reduced. Thus, speeding up of frame retransmission as well as a reduction in processing loads and power consumption of the STAs 200-2 can be realized.

5. APPLICATION EXAMPLES

The technology according to the present disclosure is applicable to various products. For example, the STA 200 may be implemented as a mobile terminal such as smartphones, tablet personal computers (PCs), notebook PCs, portable game terminals, or digital cameras, a fixed-type terminal such as television receivers, printers, digital scanners, or network storages, or a car-mounted terminal such as car navigation devices. In addition, the STA 200 may be implemented as a terminal (also referred to as machine type communication (MTC) terminal) which performs machine-to-machine (M2M) communication, such as smart meters, vending machines, remote monitoring devices, and point of sale (POS) terminals. Furthermore, the STA 200 may be a wireless communication module mounted in such terminals (e.g., integrated circuit modules including one die).

On the other hand, in one example, the AP 100 may be implemented as a wireless LAN access point (also referred to as wireless base station) having or not having a router function. In addition, the AP 100 may be implemented as a mobile wireless LAN router. Furthermore, the AP 100 may be a wireless communication module mounted on these devices (e.g., integrated circuit modules including one die).

5-1. First Application Example

Figure 19:
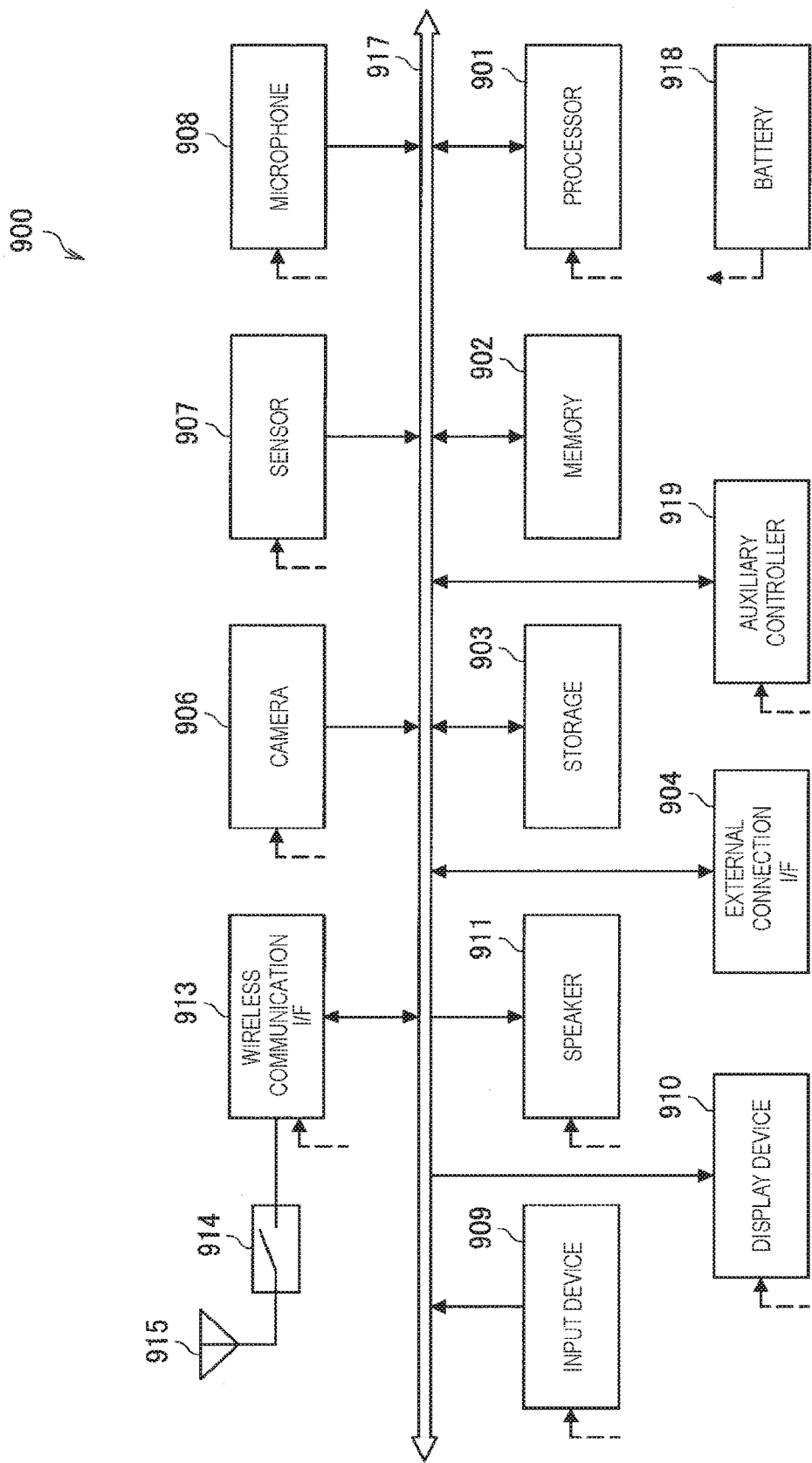
FIG. 19 is a block diagram illustrating an example of a schematic configuration of a smartphone.

FIG. 19 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The external connection interface 904 is an interface for connecting an external device such as a memory card or a universal serial bus (USB) device to the smartphone 900.

The camera 906 includes, for example, an image sensor such as a charge coupled device (CCD) or a complementary metal oxide semiconductor (CMOS), and generates a captured image. The sensor 907 can include a sensor group such as a positioning sensor, a gyro sensor, a geomagnetic sensor, and an acceleration sensor, for example. The microphone 908 converts voice input to the smartphone 900 into an audio signal. The input device 909 includes, for example, a touch sensor that detects touches on a screen of the display device 910, a key pad, a keyboard, buttons, switches, and the like, and accepts an operation or information input from a user. The display device 910 includes a screen such as a liquid crystal display (LCD) or an organic light emitting diode (OLED) display, and displays an output image of the smartphone 900. The speaker 911 converts an audio signal output from the smartphone 900 into voice.

The wireless communication interface 913 supports one or more wireless LAN standards such as IEEE 802.11A, 11b, 11g, 11n, 11ac, and 11ad, and executes wireless communication. The wireless communication interface 913 can communicate with other devices via a wireless LAN access point in the infrastructure mode. In addition, the wireless communication interface 913 can directly communicate with other devices in a direct communication mode such as an ad hoc mode or Wi-Fi Direct (registered trademark). Note that in Wi-Fi Direct mode, unlike ad hoc mode, one of two terminals operates as an access point, but communication is performed directly between the terminals. The wireless communication interface 913 can typically include a baseband processor, a radio frequency (RF) circuit, a power amplifier, and the like. The wireless communication interface 913 may be a single-chip module on which a memory for storing a communication control program, a processor for executing the program, and a relevant circuit are integrated. The wireless communication interface 913 may support other types of wireless communication schemes such as a short-range wireless communication scheme, a proximity wireless communication scheme, or a cellular communication scheme, in addition to the wireless LAN scheme. The antenna switch 914 switches a connection destination of the antenna 915 among a plurality of circuits (e.g., circuits for different wireless communication schemes) included in the wireless communication interface 913. The antenna 915 includes a single antenna element or a plurality of antenna elements (e.g., a plurality of antenna elements included a MIMO antenna), and is used for transmission and reception of a wireless signal from the wireless communication interface 913.

Note that the configuration of the smartphone 900 is not limited to the example of FIG. 19, and the smartphone 900 may include a plurality of antennas (e.g., an antenna for a wireless LAN and an antenna for a proximity wireless communication scheme and the like). In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 illustrated in FIG. 19 via a power supply line partially indicated by dashed lines in the figure. The auxiliary controller 919 operates the required minimum functions of the smartphone 900, for example, in the sleep mode.

In the smartphone 900 illustrated in FIG. 19, the data processing unit 210, the wireless communication unit 220, and the control unit 230 described using FIG. 4 may be implemented by the wireless communication interface 913. In addition, at least some of the functions may be implemented by the processor 901 or the auxiliary controller 919. For example, the control unit 230 generates the above-described measurement information and reception information, and the data processing unit 210 generates an alert frame including the generated measurement information and reception information. Then, the wireless communication unit 220 transmits the generated alert frame. Accordingly, since frames are retransmitted from the transmission source of the frames without using an acknowledgement response frame, communication efficiency can be improved while reliability in communication of the smartphone 900 is maintained.

Note that the smartphone 900 may operate as a wireless access point (software AP) if the processor 901 executes an access point function at the application level. In addition, the wireless communication interface 913 may have the wireless access point function.

5-2. Second Application Example

Figure 20:
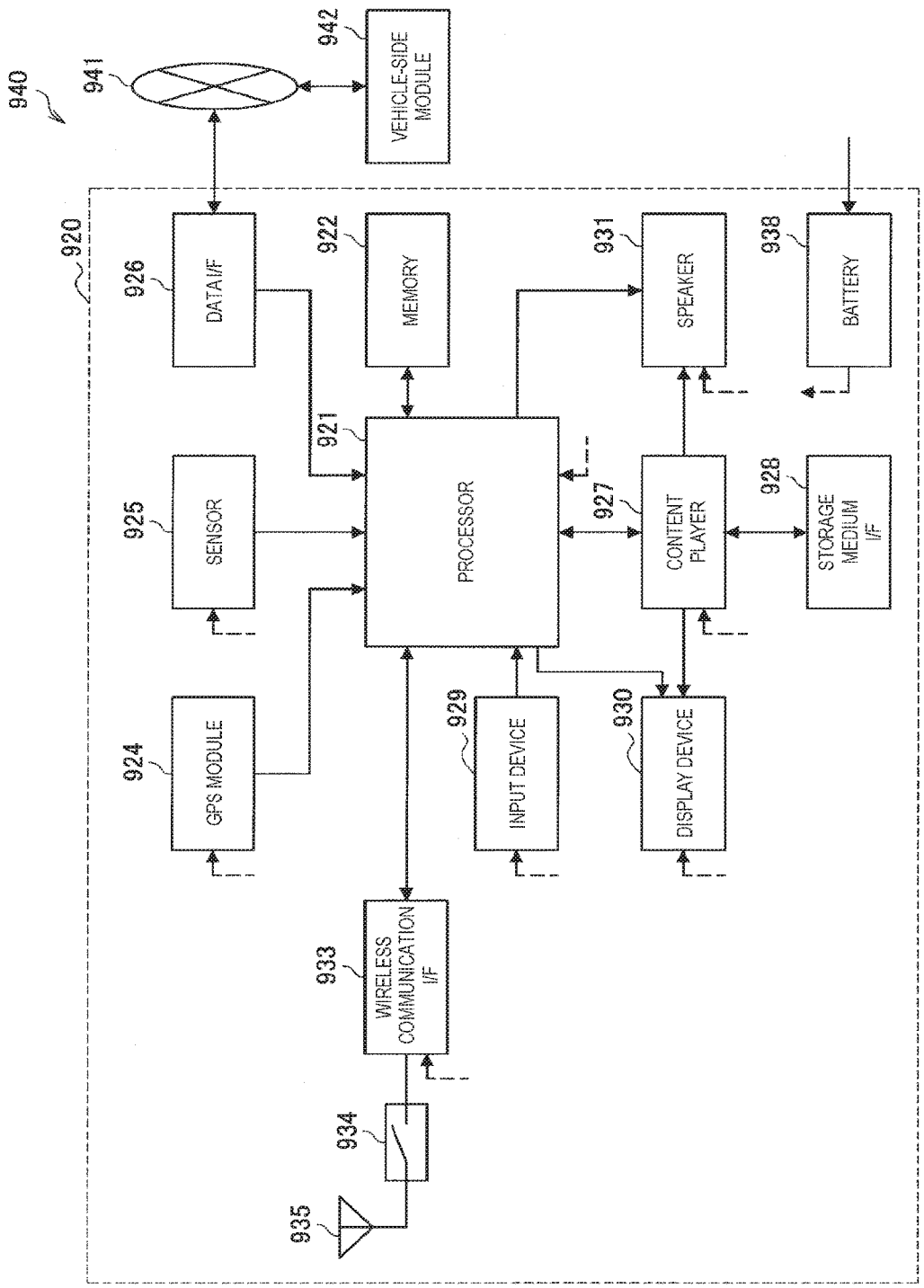
FIG. 20 is a block diagram illustrating an example of a schematic configuration of a car navigation device.

FIG. 20 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or SoC, and controls a navigation function and other functions of the car navigation device 920. The memory 922 includes a RAM and a ROM, and stores programs executed by the processor 921 and data.

The GPS module 924 measures the position (e.g., latitude, longitude, and altitude) of the car navigation device 920 using GPS signals received from a GPS satellite. The sensor 925 can include a sensor group such as a gyro sensor, a geomagnetic sensor, and a barometric pressure sensor, for example. The data interface 926 is connected to, for example, an in-vehicle network 941 via a terminal that is not illustrated, and acquires data generated on the vehicle side such as car speed data.

The content player 927 reproduces the content stored in a storage medium (e.g., CD or DVD) inserted into the storage medium interface 928. The input device 929 includes, for example, a touch sensor that detects touches on a screen of the display device 930, buttons, switches, and the like, and accepts an operation or information input from the user. The display device 930 includes a screen such as an LCD or an OLED display, and displays a navigation function or an image of content. The speaker 931 outputs sound of the navigation function or the content to be reproduced.

The wireless communication interface 933 supports one or more wireless LAN standards such as IEEE 802.11a, 11b, 11g, 11n, 11ac, and 11ad, and executes wireless communication. The wireless communication interface 933 can communicate with other devices via a wireless LAN access point in the infrastructure mode. In addition, the wireless communication interface 933 can directly communicate with other devices in a direct communication mode such as an ad hoc mode and Wi-Fi Direct. The wireless communication interface 933 can typically include a baseband processor, an RF circuit, a power amplifier, and the like. The wireless communication interface 933 may be a single-chip module on which a memory for storing a communication control program, a processor for executing the program, and a relevant circuit are integrated. The wireless communication interface 933 may support other types of wireless communication schemes such as a short-range wireless communication scheme, a proximity wireless communication scheme, or a cellular communication scheme, in addition to the wireless LAN scheme. The antenna switch 934 switches a connection destination of the antenna 935 among a plurality of circuits included in the wireless communication interface 933. The antenna 935 includes a single antenna element or a plurality of antenna elements, and is used for transmission and reception of a wireless signal from the wireless communication interface 933.

Note that the configuration of the car navigation device 920 is not limited to the example of FIG. 20, and the car navigation device 920 may include a plurality of antennas. In this case, the antenna switch 934 may be omitted from the configuration of the car navigation device 920.

The battery 938 supplies electric power to each of the blocks of the car navigation device 920 illustrated in FIG. 20 via a power supply line partially indicated by a dashed line in the figure. In addition, the battery 938 accumulates electric power supplied from the vehicle side.

In the car navigation device 920 illustrated in FIG. 20, the data processing unit 210, the wireless communication unit 220, and the control unit 230 described using FIG. 4 may be implemented by the wireless communication interface 933. In addition, at least some of the functions may be implemented by the processor 921. For example, the control unit 230 generates the above-described measurement information and reception information, and the data processing unit 210 generates an alert frame including the generated measurement information and reception information. Then, the wireless communication unit 220 transmits the generated alert frame. Accordingly, since frames are retransmitted from the transmission source of the frames without using an acknowledgement response frame, communication efficiency can be improved while reliability in communication of the car navigation device 920 is maintained.

In addition, the wireless communication interface 933 may operate as the above-described AP 100 and provide wireless connection to a terminal of a user getting on a vehicle. At that time, in a case in which an alert frame is received from the terminal of the user, for example, frame retransmission control is performed on the basis of reception information included in the alert frame. Accordingly, frames can be retransmitted without using an acknowledgement response frame, and communication efficiency can be improved while reliability in communication between the car navigation device 920 and the terminal of the user is maintained.

In addition, the technology according to the present disclosure may be implemented as an in-vehicle system (or vehicle) 940 including one or more blocks of the above-described car navigation device 920, the in-vehicle network 941, and a vehicle-side module 942. The vehicle-side module 942 generates vehicle-side data such as vehicle speed, engine rpm, or failure information, and outputs the generated data to the in-vehicle network 941.

5-3. Third Application Example

Figure 21:
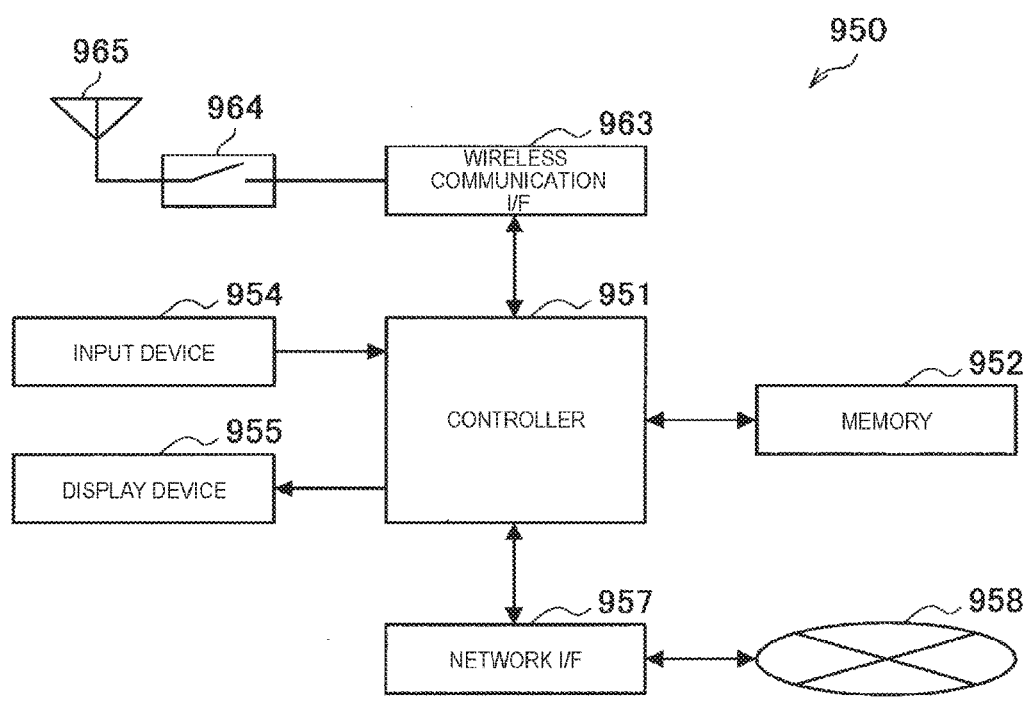
FIG. 21 is a block diagram illustrating an example of a schematic configuration of a wireless access point.

FIG. 21 is a block diagram illustrating an example of a schematic configuration of a wireless access point 950 to which the technology according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and operates various functions (e.g., access restriction, routing, encryption, firewall, log management, and the like) of the Internet Protocol (IP) layer and higher layers of the wireless access point 950. The memory 952 includes a RAM and a ROM, and stores a program to be executed by the controller 951 and various kinds of control data (e.g., a terminal list, a routing table, an encryption key, security settings, a log, and the like).

The input device 954 includes, for example, a button, a switch, or the like, and accepts an operation from a user. The display device 955 includes an LED lamp or the like, and displays operation status of the wireless access point 950.

The network interface 957 is a wired communication interface for the wireless access point 950 to connect to a wired communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards such as IEEE 802.11a, 11b, 11g, 11n, 11ac, and 11ad, and provides wireless connection to a neighboring terminal by functioning as an access point. The wireless communication interface 963 can typically include a baseband processor, an RF circuit, a power amplifier, and the like. The wireless communication interface 963 may be a single-chip module on which a memory for storing a communication control program, a processor for executing the program, and a relevant circuit are integrated. The antenna switch 964 switches a connection destination of the antenna 965 among a plurality of circuits included in the wireless communication interface 963. The antenna 965 includes a single antenna element or a plurality of antenna elements, and is used for transmission and reception of a wireless signal from the wireless communication interface 963.

In the wireless access point 950 illustrated in FIG. 21, the data processing unit 210, the wireless communication unit 220, and the control unit 230 described using FIG. 4 may be implemented by the wireless communication interface 963. In addition, at least some of the functions may be implemented by the controller 951. For example, in a case in which an alert frame is received from a terminal serving as a communication partner of the wireless access point 950, frame retransmission control is performed on the basis of reception information included in the alert frame. Accordingly, frames can be retransmitted without using an acknowledgement response frame, and communication efficiency can be improved while reliability in communication of the wireless access point 950 and the terminal is maintained.

6. CONCLUSION

According to the first embodiment of the present disclosure above, the AP 100-1 can obtain reception information from the STAs 200-1 without performing communication with the individual STAs 200-1, such as exchange of BAR frames and BA frames of the past. Thus, communication efficiency can be improved while reliability in communication is maintained in comparison to the case in which the block ACK mechanism of the past is used.

In addition, according to the second embodiment of the present disclosure, since the STAs 200-2 are notified of a measurement start time point through measurement start frames, the STAs may start measurement from the notified measurement start time point. Thus, the STAs 200-2 may not perform normal measurement and recording of measurement results. As a result, processing loads and power consumption of the STAs 200-2 can be reduced.

Furthermore, according to the third embodiment of the present disclosure, the STAs 200-2 does not necessarily perform normal measurement and recording of measurement results as in the second embodiment. Moreover, since no measurement end frame is transmitted, communication overhead for frame retransmission can be reduced. Thus, speeding up of frame retransmission as well as a reduction in processing loads and power consumption of the STAs 200-2 can be realized.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although frame retransmission is designed to be controlled on the basis of reception of an alert frame in the embodiments, for example, the present technology is not limited thereto. For example, a modulation scheme may be controlled on the basis of reception of an alert frame.

In addition, although a case in which a measurement end time point arrives during reception of a frame is not mentioned in the above-described embodiments, a frame being received may be excluded from measurement subjects in that case. Furthermore, in the case where the frame being received is an aggregation frame, a subframe that is received until the measurement end time point arrives may be set as a measurement subject, and a subframe that is not yet received until the measurement end time point may be excluded from measurement subjects.

In addition, although the example in which only an STA 200 that satisfies the predetermined condition that a reception characteristic index value or a statistical value is lower than the threshold value transmits an alert frame has been described in the above-described embodiment, all STAs 200 serving as destinations of measurement instruction frames may transmit alert frames. Furthermore, by performing, by the AP 100, a process corresponding to the above-described process of the STAs 200 determining whether an alert frame is to be transmitted in that case, whether the received alert frame is to be used (or discarded) is determined. Accordingly, processing loads and power consumption of the STAs 200 can be more reduced.

Note that, although sizes of respective pieces of information are shown in FIG. 5 and the like, sizes of the respective pieces of information are of course not limited thereto. In addition, the same applies to arrangement order of respective pieces of information.

In addition, a value such as an index value, a statistical value, or the like in the above-described embodiments is any one of a raw value, a value obtained by quantizing a raw value, a value at a specific time point, an average value in a specific period, a mode, a median, a representative value such as a maximum value or a minimum value, and an index corresponding to a value derived uniquely from a raw value or a value obtained by quantizing a raw value.

Furthermore, although processes are designed to be performed for multicast communication in the above-described embodiments, corresponding processes may also be performed for another type of communication such as frame multiplexing communication in which frames are transmitted to a plurality of destinations at a time.

In addition, although the example in which a single kind of measurement instruction frame is transmitted has been described in the above-described embodiments, a plurality of measurement instruction frames may be transmitted. Specifically, the AP 100 may consecutively transmit both or one of a measurement start frame and a measurement end frame a predetermined number of times. In this case, a rate of successfully received measurement instruction frames can be raised. Thus, it is possible to cause the STAs 200 to measure a reception characteristic or the like as the AP 100 expects and to enhance certainty of collecting measurement information from the STAs 200 which are collection subjects. Note that, if the same measurement instruction frames are received in an overlapping manner in that case, the STAs 200 execute a measurement process on the basis of a measurement instruction frame that is already received and ignore the received overlapping measurement instruction frames.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

Additionally, the present technology may also be configured as below.

(1)

A wireless communication device including:

a communication unit configured to receive a first frame including reception information in which whether a frame has been received is specified, the first frame being transmitted on a basis of measurement information regarding reception of a frame; and a control unit configured to perform frame retransmission control on a basis of the reception information.

(2)

The wireless communication device according to (1), in which the first frame includes the measurement information, and the control unit performs frame retransmission control on a basis of the measurement information and the reception information.

(3)

The wireless communication device according to (1) or (2), in which the communication unit transmits a measurement instruction frame including measurement instruction information to be used for notification of the measurement information.

(4)

The wireless communication device according to (3), in which the measurement instruction information includes at least one of measurement time information, transmission time information of the first frame, and measurement content information.

(5)

The wireless communication device according to (4), in which the measurement time information includes information in which at least one of a measurement start time point, a measurement end time point, and a measurement time length is specified.

(6)

The wireless communication device according to (4) or (5), in which the transmission time information of the first frame includes information in which a start time point or an end time point of a period in which transmission of the first frame is permitted is specified or information in which a transmission permission time length is specified.

(7)

The wireless communication device according to any one of (4) to (6), in which the measurement content information includes reception characteristic information in which an index indicating at least one reception characteristic of communication throughput, a frame loss rate, a number of successfully received multicast frames, and a ratio of a signal amount to a noise amount, an interference amount, or a sum of a noise amount and an interference amount, all of which are measurement subjects, is specified.

(8)

The wireless communication device according to (7), in which the reception characteristic information includes information in which a threshold value of an index indicating a reception characteristic is specified.

(9)

The wireless communication device according to any one of (3) to (8), in which the measurement instruction frame further includes information in which a sequence number of a frame at which determination of whether a frame has been received starts or a size of the reception information is specified.

(10)

The wireless communication device according to any one of (3) to (9), in which the measurement instruction frame includes at least one of a management frame including a measurement request frame or a beacon frame, a control frame, a data frame, and a subframe included in an aggregation frame.

(11)

The wireless communication device according to any one of (3) to (10), in which the measurement instruction frame includes at least one of a measurement start frame for performing notification of a start of measurement and a measurement end frame for performing notification of an end of measurement.

(12)

A wireless communication device including:

a communication unit configured to transmit a first frame including reception information in which whether a frame has been received is specified on a basis of measurement information regarding reception of a frame.

(13)

The wireless communication device according to (12), in which the communication unit receives a measurement instruction frame including measurement instruction information, and whether the first frame is to be transmitted is controlled on a basis of the measurement instruction information and the measurement information.

(14)

The wireless communication device according to (13), in which the measurement instruction frame includes a measurement start frame for performing notification of a start of measurement and a measurement end frame for performing notification of an end of measurement, and the communication unit controls whether the first frame including the measurement information generated on a basis of reception of the measurement start frame or the measurement end frame is to be transmitted on a basis of whether the measurement start frame and the measurement end frame have been received.

(15)

The wireless communication device according to (14), in which, in a case in which another measurement start frame is received again after the measurement start frame is received before the measurement end frame is received, the communication unit transmits the first frame including the measurement information generated through measurement based on the measurement start frame received again.

(16)

The wireless communication device according to any one of (12) to (15), in which the measurement information is included in a payload or a header of the first frame.

(17)

The wireless communication device according to any one of (12) to (16), in which the first frame includes at least one of a management frame including a measurement report frame, a control frame including a block acknowledgement (ACK) frame, a data frame, and a subframe included in an aggregation frame.

(18)

A wireless communication method including:

receiving, by a communication unit, a first frame including reception information in which whether a frame has been received is specified, the first frame being transmitted on a basis of measurement information regarding reception of a frame; and performing, by a control unit, frame retransmission control on a basis of the reception information.

(19)

A wireless communication method including:

transmitting, by a communication unit, a first frame including reception information in which whether a frame has been received is specified on a basis of measurement information regarding reception of a frame.

(20)

A wireless communication system including:

a wireless communication device configured to transmit a first frame including reception information in which whether a frame has been received is specified on a basis of measurement information regarding reception of a frame; and a wireless communication device configured to receive the first frame and perform frame retransmission control on a basis of the reception information.

REFERENCE SIGNS LIST

100 AP
110, 210 data processing unit
120, 220 wireless communication unit
130, 230 control unit
140, 240 storage unit
200 STA

The invention claimed is:

1. A wireless communication device comprising:
a memory: and
circuitry coupled to the memory, configured to:
transmit a multicast frame to a plurality of second wireless communication devices;
transmit a measurement instruction frame to the plurality of second wireless communication devices, the measurement instruction frame including measurement instruction information to be used for notification of measurement information;
receive a first frame including reception information from at least one of the plurality of second wireless communication devices, the reception information indicating whether the multicast frame has been received by the at least one of the plurality of second wireless communication devices and the first frame being transmitted on a basis of the measurement information regarding reception of the multicast frame; and
retransmit the multicast frame to the plurality of second wireless communication devices on a basis of the reception information, without sending an acknowledgement request to the plurality of second wireless communication devices, upon retransmitting the multicast frame,
wherein the measurement instruction information includes at least one of measurement time information, transmission time information of the first frame, and measurement content information, the measurement content information including reception characteristic information, the reception characteristic information including at least one of reception throughput, a frame loss rate, a number of successfully received the multicast frame, and a ratio of a signal amount to a noise amount, an interference amount, or a sum of the noise amount and the interference amount, and the reception characteristic information being measured by the plurality of second wireless communication devices,
wherein the reception characteristic information further includes a threshold value corresponding to each of the reception throughput, the frame loss rate, the number of successfully received the multicast frame, and the ratio of the signal amount to the noise amount, the interference amount, or the sum of the noise amount and the interference amount,
wherein the first frame is transmitted from the at least one of the plurality of second wireless communication devices, when at least one of the reception characteristic information is less than the threshold value corresponding to the at least one of the reception characteristic information.

2. The wireless communication device according to claim 1,
wherein the first frame includes the measurement information, and
the circuitry is configured retransmit the multicast frame to the plurality of second wireless communication devices on a basis of the measurement information and the reception information.

3. The wireless communication device according to claim 1, wherein the measurement time information includes at least one of a measurement start time point at the plurality of second wireless communication devices, a measurement end time point at the plurality of second wireless communication devices, a number of measurement times by the plurality of second wireless communication devices, and a measurement time length at the plurality of second wireless communication devices.

4. The wireless communication device according to claim 1, wherein the transmission time information of the first frame includes at least one of a start time point of transmission permitted period of the first frame at the plurality of second wireless communication devices and an end time point of transmission permitted period of the first frame at the plurality of second wireless communication devices, or information of a transmission permission time length at the plurality of second wireless communication devices.

5. The wireless communication device according to claim 1, wherein the measurement instruction frame includes at least one of a measurement start frame for performing notification of a start of measurement and a measurement end frame for performing notification of an end of measurement.

6. The wireless communication device according to claim 1,
wherein the first frame is transmitted as a Block ACK frame (BA frame) from the at least one of the plurality of second wireless communication devices.

7. A wireless communication device comprising:
a memory: and
circuitry coupled to the memory, configured to:
transmit a first frame including reception information to other wireless communication device, in response to a multicast frame and a measurement instruction frame received from the other wireless communication device, the reception information indicating whether the multicast frame has been received and the first frame being transmitted on a basis of measurement information regarding reception of the multicast frame, the measurement instruction frame including measurement instruction information to be used for notification of measurement information; and
receive the multicast frame from the other wireless communication device on a basis of the reception information, the multicast frame being retransmitted from the other wireless communication device to a plurality of wireless communication devices including the wireless communication device, without an acknowledgement request from the other wireless communication device to the plurality of wireless communication devices, upon retransmitting the multicast frame,
wherein the measurement instruction information includes at least one of measurement time information, transmission time information of the first frame, and measurement content information, the measurement content information including reception characteristic information, the reception characteristic information including at least one of reception throughput, a frame loss rate, a number of successfully received the multicast frame, and a ratio of a signal amount to a noise amount, an interference amount, or a sum of the noise amount and the interference amount, and the reception characteristic information being measured by the wireless communication device, wherein the reception characteristic information further includes a threshold value corresponding to each of the reception throughput, the frame loss rate, the number of successfully received the multicast frame, and the ratio of the signal amount to the noise amount, the interference amount, or the sum of the noise amount and the interference amount, wherein the first frame is transmitted from the wireless communication device, when at least one of the reception characteristic information is less than the threshold value corresponding to the at least one of the reception characteristic information.

8. The wireless communication device according to claim 7, wherein the measurement instruction frame includes a measurement start frame as a notification of a start of measurement and a measurement end frame as a notification of an end of measurement, and the circuitry is configured to generate the measurement information on a basis of reception of the measurement start frame or the measurement end frame.

9. The wireless communication device according to claim 7, wherein, when the circuitry receives another measurement start frame after receiving the measurement start frame and before receiving the measurement end frame, the circuitry transmits the first frame including the measurement information generated through measurement based on the another measurement start frame.

10. The wireless communication device according to claim 7, wherein the measurement information is included in a payload or a header of the first frame.

11. The wireless communication device according to claim 7, wherein the first frame includes at least one of a management frame including a measurement report frame, a control frame including a block acknowledgement (ACK) frame, a data frame, and a subframe included in an aggregation frame.

12. A wireless communication method comprising:

transmitting, by a circuitry, a multicast frame to a plurality of second wireless communication devices;

transmitting, by a circuitry, a measurement instruction frame to the plurality of second wireless communication devices, the measurement instruction frame including measurement instruction information to be used for notification of measurement information;

receiving, by the circuitry, a first frame including reception information from at least one of the plurality of second wireless communication devices, the reception information indicating whether the multicast frame has been received by the at least one of the plurality of second wireless communication devices and the first frame being transmitted on a basis of the measurement information regarding reception of the multicast frame; and retransmitting, by the circuitry, the multicast frame to the plurality of second wireless communication devices on a basis of the reception information, without sending an acknowledgement request to the plurality of second wireless communication devices, upon retransmitting the multicast frame, wherein the measurement instruction information includes at least one of measurement time information, transmission time information of the first frame, and measurement content information, the measurement content information including reception characteristic information, the reception characteristic information including at least one of reception throughput, a frame loss rate, a number of successfully received the multicast frame, and a ratio of a signal amount to a noise amount, an interference amount, or a sum of the noise amount and the interference amount, and the reception characteristic information being measured by the plurality of second wireless communication devices, wherein the reception characteristic information further includes a threshold value corresponding to each of the reception throughput, the frame loss rate, the number of successfully received the multicast frame, and the ratio of the signal amount to the noise amount, the interference amount, or the sum of the noise amount and the interference amount, wherein the first frame is transmitted from the at least one of the plurality of second wireless communication devices, when at least one of the reception characteristic information is less than the threshold value corresponding to the at least one of the reception characteristic information.

13. A wireless communication method comprising:

transmitting, by a circuitry, a first frame including reception information to other wireless communication device, in response to a multicast frame and a measurement instruction frame received from the other wireless communication device, the reception information indicating whether the multicast frame has been received and the first frame being transmitted on a basis of measurement information regarding reception of the multicast frame, the measurement instruction frame including measurement instruction information to be used for notification of measurement information; and receiving, by the circuitry, the multicast frame from the other wireless communication device on a basis of the reception information, the multicast frame being retransmitted from the other wireless communication device to a plurality of wireless communication devices including the wireless communication device, without an acknowledgement request from the other wireless communication device to the plurality of wireless communication devices, upon retransmitting the multicast frame, wherein the measurement instruction information includes at least one of measurement time information, transmission time information of the first frame, and measurement content information, the measurement content information including reception characteristic information, the reception characteristic information including at least one of reception throughput, a frame loss rate, a number of successfully received the multicast frame, and a ratio of a signal amount to a noise amount, an interference amount, or a sum of the noise amount and the interference amount, and the reception characteristic information being measured by the wireless communication device, wherein the reception characteristic information further includes a threshold value corresponding to each of the reception throughput, the frame loss rate, the number of successfully received the multicast frame, and the ratio of the signal amount to the noise amount, the interference amount, or the sum of the noise amount and the interference amount, wherein the first frame is transmitted from the wireless communication device, when at least one of the reception characteristic information is less than the threshold value corresponding to the at least one of the reception characteristic information.

14. A wireless communication system comprising a first wireless communication device and a plurality of second wireless communication devices:

wherein the first wireless communication device is configured to transmit a multicast frame to the plurality of second wireless communication devices;

wherein the first wireless communication device is configured to transmit a measurement instruction frame to the plurality of second wireless communication devices, the measurement instruction frame including measurement instruction information to be used for notification of measurement information;

wherein the first wireless communication device is configured to receive a first frame including reception information from at least one of the plurality of second wireless communication devices, the reception information indicating whether the multicast frame has been received by the at least one of the plurality of second wireless communication devices and the first frame being transmitted on a basis of the measurement information regarding reception of the first multicast frame; and wherein the first wireless communication device is configured to retransmit the multicast frame to the plurality of second wireless communication devices on a basis of the reception information, without sending an acknowledgement request to the plurality of second wireless communication devices, upon retransmitting the multicast frame, wherein the measurement instruction information includes at least one of measurement time information, transmission time information of the first frame, and measurement content information, the measurement content information including reception characteristic information, the reception characteristic information including at least one of reception throughput, a frame loss rate, a number of successfully received the multicast frame, and a ratio of a signal amount to a noise amount, an interference amount, or a sum of the noise amount and the interference amount, and the reception characteristic information being measured by the plurality of second wireless communication devices, wherein the reception characteristic information further includes a threshold value corresponding to each of the reception throughput, the frame loss rate, the number of successfully received the multicast frame, and the ratio of the signal amount to the noise amount, the interference amount, or the sum of the noise amount and the interference amount, wherein the first frame is transmitted from the at least one of the plurality of second wireless communication devices, when at least one of the reception characteristic information is less than the threshold value corresponding to the at least one of the reception characteristic information.

* * * * *